United States Patent
He et al.

(10) Patent No.: US 11,741,748 B2
(45) Date of Patent: Aug. 29, 2023

(54) PASSIVE IMAGE DEPTH SENSING FOR OBJECT VERIFICATION BASED ON CHROMATIC DIFFERENTIATION

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 148 days.

(21) Appl. No.: 17/373,794

(22) Filed: Jul. 13, 2021

(65) Prior Publication Data
US 2022/0114359 A1     Apr. 14, 2022

Related U.S. Application Data

(60) Provisional application No. 63/091,315, filed on Oct. 14, 2020.

(51) Int. Cl.
*G06V 40/16* (2022.01)
*G06T 7/55* (2017.01)
(Continued)

(52) U.S. Cl.
CPC ............ *G06V 40/166* (2022.01); *G06T 7/40* (2013.01); *G06T 7/55* (2017.01); *G06V 10/751* (2022.01);
(Continued)

(58) Field of Classification Search
CPC .... G06V 40/166; G06V 40/168; G06V 40/40; G06V 40/161; G06V 40/172;
(Continued)

(56) References Cited

U.S. PATENT DOCUMENTS

2016/0014392 A1* 1/2016 Liang ................. G06T 7/11
                                            348/47
2018/0196997 A1   7/2018 Price et al.
2022/0245964 A1* 8/2022 Levinski ............. G06V 40/166

FOREIGN PATENT DOCUMENTS

CN     107257992 A    10/2017
CN     110766758 A     2/2020
(Continued)

OTHER PUBLICATIONS

State Intellectual Property Office of the People's Republic of China, Notice of Allowance Issued in related Application No. 202111185550.1, dated Apr. 15, 2023, 5 pages.

*Primary Examiner* — Edward F Urban
*Assistant Examiner* — Wassim Mahrouka
(74) *Attorney, Agent, or Firm* — Kilpatrick Townsend & Stockton LLP

(57) ABSTRACT

Techniques are described for passive three-dimensional (3D) image sensing based on chromatic differentiation for use in object verification. For example, multiple sub-images correspond to 3D feature regions of an object. The sub-images can be analyzed to obtain respective sets of feature depth measurements (e.g., depth, textural signatures, etc.) based on multiple differentiated chromatic components of raw image sensor data captured from the object. A verification signal can be output as a function of comparing the respective sets of feature depth measurements from the plurality of characteristic sub-images to previously stored feature depth expectations, such that the verification signal indicates whether an identity of the object is verified and/or whether the object is a spoof.

28 Claims, 16 Drawing Sheets

(51) Int. Cl.
    *G06T 7/40*          (2017.01)
    *G06V 10/75*       (2022.01)
    *G06V 20/64*       (2022.01)
    *G06V 40/40*       (2022.01)

(52) U.S. Cl.
    CPC ............ *G06V 20/64* (2022.01); *G06V 40/168* (2022.01); *G06V 40/40* (2022.01); *G06T 2207/10024* (2013.01); *G06T 2207/30201* (2013.01)

(58) Field of Classification Search
    CPC .. G06V 10/751; G06V 2201/12; G06V 20/52; G06T 7/40; G06T 7/55; G06T 2207/10024; G06T 2207/30201; H04N 13/271; H04N 23/55; H04N 23/54; H04N 23/88
    See application file for complete search history.

(56) References Cited

FOREIGN PATENT DOCUMENTS

| | | |
|---|---|---|
| CN | 111670576 A | 9/2020 |
| EP | 1343308 A2 | 9/2003 |
| JP | 2000209598 A | 7/2000 |

\* cited by examiner

PASSIVE IMAGE DEPTH SENSING FOR OBJECT VERIFICATION BASED ON CHROMATIC DIFFERENTIATION

CROSS-REFERENCES

This application claims the benefit of priority from U.S. Provisional Patent Application No. 63/091,315, titled "PASSIVE IMAGE DEPTH SENSING FOR OBJECT VERIFICATION BASED ON CHROMATIC DIFFERENTIATION", filed Oct. 14, 2020, which is hereby incorporated by reference in its entirety.

FIELD

The invention relates generally to optics integrated into personal electronic devices. More particularly, embodiments relate to passive image depth sensing for object verification based on chromatic differentiation, such as for biometric facial recognition and/or other image depth sensing to support features of a smart phone camera system.

BACKGROUND

In the past, photography was a discipline reserved to those with specialized knowledge and equipment. Over the past decades, innovations in digital photographic hardware and software, and the worldwide spread of smartphones with integrated digital cameras, have placed digital photography at the fingertips of billions of consumers. In this environment of ubiquitous access to digital photography and videography, consumers increasingly desire to be able to quickly and easily capture moments using their smartphones. Advances in digital photography have included advances in capturing of three-dimensional information for various purposes. For example, capturing of depth and other three-dimensional information can support three-dimensional photography and videography, as well as advanced automation in focus, stabilization, aberration correction, and other features.

Depth information is typically captured using active techniques, such as time-of-fly techniques, or triangulation techniques. For example, focused light pulses can be transmitted, and their reflections can be subsequently received; and knowledge of various parameters (e.g., the speed of light) can be used to convert pulse receipt timing into a depth measurement. Conventionally, it has been difficult to integrate such time-of-fly and other techniques in portable digital electronics applications, such as smart phones. For example, some conventional approaches rely on separate optical systems, relatively large optics, and/or specialized illumination sources that do not fit within spatial limitations of many portable digital electronic applications; while other conventional approaches tend not to be reliable or accurate enough to support more advanced features.

BRIEF SUMMARY OF THE INVENTION

Embodiments provide passive three-dimensional (3D) image sensing based on chromatic focal differentiation, such as for depth mapping of a 3D image space to support features of a smart phone camera system. For example, an object can be imaged by using a photodetector array to detect light that has reflected off of the object, and been focused through a lens onto the array. Light components of different wavelengths tends to be focused through the lens to different focal lengths, which can tend to impact the brightness of each wavelength as detected. For example, if the detector array is closer to a shorter-wavelength focal plane, a white spot will tend to be detected with a higher magnitude of blue light components than of red light components. Ratios of brightness magnitudes for different wavelengths vary in a manner that strongly correlates to object distance from the lens. Embodiments exploit this correlation to passively detect object distance. Some embodiments further provide various types of distance and/or chromatic calibration to further facilitate such detection.

According to one set of embodiments, a passive three-dimensional imaging system is provided. The system includes: a lens assembly to receive light reflected off of a target scene object and to focus the received light, such that a smaller-wavelength component of the received light is focused to a target smaller-wavelength focal plane, and a larger-wavelength component of the received light is focused to a target larger-wavelength focal plane; an image sensor in optical communication with the lens assembly and comprising a plurality of photodetector elements, a first subset of the photodetector elements configured to produce a first set of chromatic responses to the smaller-wavelength component of the received light, and a second subset of the photodetector elements configured to produce a second set of chromatic responses to the larger-wavelength component of the received light; and a processor. The processor is configured to: receive raw image data from the image sensor indicating the first set of chromatic responses and the second set of chromatic responses; compute a first magnitude of chromatic response (MCR) from the first set of chromatic responses and a second MCR from the second set of chromatic responses; and determine a target object distance of the target scene object away from the lens assembly based on a ratio between the first MCR and the second MCR.

According to another set of embodiments, a method is provided for passive three-dimensional imaging. The method includes: receiving raw image data from an image sensor indicating a first set of chromatic responses and a second set of chromatic responses responsive to received light reflected off of a target scene object and focused by a lens onto the image sensor, such that a smaller-wavelength component of the received light is focused according to a target smaller-wavelength focal plane, and a larger-wavelength component of the received light is focused according to a target larger-wavelength focal plane, the first set of chromatic responses produced by the image sensor responsive the smaller-wavelength component of the received light, the second set of chromatic responses produced by the image sensor responsive to the larger-wavelength component of the received light; computing a first magnitude of chromatic response (MCR) from the first set of chromatic responses; computing a second MCR from the second set of chromatic responses; computing a MCR ratio as between the first MCR and the second MCR; and determining a target object distance of the target scene object away from the lens based on the MCR ratio.

According to another set of embodiments, a system is provided for passive three-dimensional imaging. The system includes one or more processors, and non-transient memory having instructions stored thereon, which, when executed by the one or more processors, cause the one or more processors to perform steps. The steps include: receiving raw image data from an image sensor indicating a first set of chromatic responses and a second set of chromatic responses responsive to received light reflected off of a target scene object and focused by a lens onto the image sensor, such that a smaller-wavelength component of the received light is focused according to a target smaller-wavelength focal plane, and a larger-wavelength component of the received light is focused according to a target larger-wavelength focal plane, the first set of chromatic responses produced by the image sensor responsive the smaller-wavelength component of the received light, the second set of chromatic responses produced by the image sensor responsive to the larger-wavelength component of the received light; computing a first magnitude of chromatic response (MCR) from the first set of chromatic responses; computing a second MCR from the second set of chromatic responses; computing a MCR ratio as between the first MCR and the second MCR; and determining a target object distance of the target scene object away from the lens based on the MCR ratio.

According to another set of embodiments, a method is provided for passive image depth sensing for object verification. The method includes: computing, for each of a plurality of characteristic sub-images corresponding to three-dimensional (3D) feature regions of an object, a respective set of feature depth measurements based on multiple differentiated chromatic components of raw image sensor data captured from the object; and outputting a verification signal as a function of comparing the respective sets of feature depth measurements from the plurality of characteristic sub-images to previously stored feature depth expectations, such that the verification signal indicates whether an identity of the object is verified and/or whether the object is a spoof.

According to another set of embodiments, a method is provided for passive image depth sensing for object verification. The method includes: capturing, using an image sensor, raw image data of an object characterized by three-dimensional (3D) feature regions, each 3D feature region associated with a respective expected depth and/or a respective expected textural signature; identifying a plurality of characteristic sub-images from the raw image data, each identified at least by mapping a corresponding one of the 3D feature regions to the raw image data; obtaining, from the raw image data for each characteristic sub-image, a respective first chromatic response from imaging the object with the image sensor, and a respective second chromatic response from imaging the object with the image sensor; computing, based on the respective first chromatic response and the respective second chromatic response for each characteristic sub-image, a respective computed depth and/or a respective computed textural signature; and outputting a verification signal for the object based on comparing the respective computed depth of each characteristic sub-image with the respective expected depth of the corresponding 3D feature region, and/or on comparing the respective computed textural signature of each characteristic sub-image with the respective expected textural signature of the corresponding 3D feature region.

According to another set of embodiments, a passive image depth sensing system is provided for object verification. The system includes: a lens assembly to receive light reflected off of an object and to focus chromatic components of the received light in accordance with respective focal lengths, the object characterized by three-dimensional (3D) feature regions, each associated with a respective expected depth and/or a respective expected textural signature; an image sensor in optical communication with the lens assembly and comprising a plurality of photodetector elements comprising first photodetector elements to produce first chromatic responses to a first chromatic component of the received light, and second photodetector elements to produce second chromatic responses to a second chromatic component of the received light; and a processor. The processor is configured to: identify, from raw image data of the object captured by the image sensor, a plurality of characteristic sub-images by mapping corresponding ones of the 3D feature regions to the raw image data; obtain, from the raw image data for each characteristic sub-image, a respective first chromatic response and a respective second chromatic response; compute, based on the respective first chromatic response and the respective second chromatic response for each characteristic sub-image, a respective computed depth and/or a respective computed textural signature; and output a verification signal for the object based on comparing the respective computed depth of each characteristic sub-image with the respective expected depth of the corresponding 3D feature region, and/or on comparing the respective computed textural signature of each characteristic sub-image with the respective expected textural signature of the corresponding 3D feature region.

According to another set of embodiments, a passive image depth sensing system is provided for object verification. The system includes: one or more processors; and non-transient memory having instructions stored thereon, which, when executed by the one or more processors, cause the one or more processors to perform steps. The steps include: computing, for each of a plurality of characteristic sub-images corresponding to three-dimensional (3D) feature regions of an object, a respective set of feature depth measurements based on multiple differentiated chromatic components of raw image sensor data captured from the object; and outputting a verification signal as a function of comparing the respective sets of feature depth measurements from the plurality of characteristic sub-images to previously stored feature depth expectations, such that the verification signal indicates whether an identity of the object is verified and/or whether the object is a spoof.

BRIEF DESCRIPTION OF THE DRAWINGS

The accompanying drawings, referred to herein and constituting a part hereof, illustrate embodiments of the disclosure. The drawings together with the description serve to explain the principles of the invention.

The patent or application file contains at least one drawing executed in color. Copies of this patent or patent application publication with color drawing(s) will be provided by the Office upon request and payment of the necessary fee.

Figure 1A:
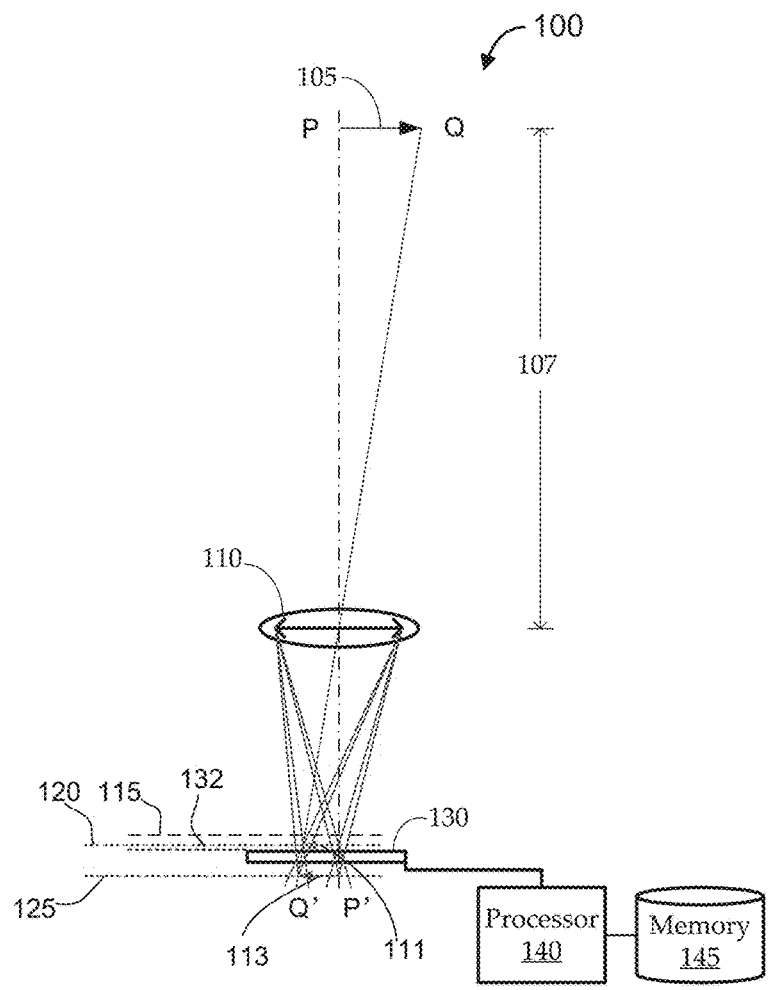
FIGS. 1A and 1B shows a passive 3D image sensing environment and illustrative imaging results, respectively, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Increasingly, digital imaging is exploiting depth information to support various features. For example, in three-dimensional (3D) computer graphics, depth maps are used to indicates information relating to the distance of the surfaces of scene objects from a viewpoint. Similarly, in digital photography, depth mapping, and the like, can be used to support 3D image capture features, enhanced auto-focusing features, and other features. Such digital 3D imaging is also being used to support platforms, such as 3D cameras, 3D robot vision, 3D vehicle mapping, etc. Conventionally, active techniques are used for acquiring such depth information. For example, so-called "time-of-fly" (TOF) techniques generally measure a distance of an object with respect to a reference point by emitting light beams towards an object, and measuring timing of reflections of the emitted light. With such techniques, distance can be computed by comparing the speed of light to the time it takes for the emitted light to be reflected back to the system. As another example, multiple structured light can be used to determine distance by transmitting multiple light beams in a manner that they converge and diverge at different distances. With such techniques, distance can be measured by separately imaging an object with each light beam, and comparing the images to determine a level of overlap, which can be correlated to distance. Such a technique is described in U.S. Pat. No. 10,489,925, titled "3D Sensing Technology Based on Multiple Structured Illumination."

Such conventional active techniques for 3D image sensing can be limited in various ways. One limitation is that the active illumination used by such conventional techniques can consume power and space, which may be limited in many applications, such as in smart phones and other portable electronic devices. Another limitation is that it can be difficult to dynamically calibrate such techniques to differences in ambient lighting, differences in how a detected object respond to illumination (e.g., based on the object's color, shape, reflectivity, etc.), and/or other differences between detection environments. Yet another limitation is that some such techniques rely on integrating additional optical systems into an environment with many physical and technical constraints.

Figure 1B:
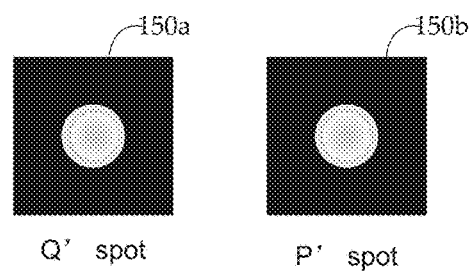

Turning first to FIGS. 1A and 1B, a passive 3D image sensing environment 100 and illustrative imaging results 150 are shown, respectively, according to various embodiments. The environment 100 includes a lens assembly 110, an image sensor 130, and processor 140. While the lens assembly 110 is shown as a single convex lens, the lens assembly 110 can include any suitable discrete lens components, such as convex and/or convex lenses, mirrors, apertures, filters, etc. For the sake of context, a representative scene object 105 is shown as extending between edges "P" and "Q". The scene object 105 is located an object distance 107 away from the lens assembly 110. While the object distance 107 is illustrated as between the scene object 105 and the filter mask 120, references herein to the object distance 107 can generally refer to a detectable distance between the scene object 105 and any suitable component. For example, the object distance 107 can indicate a distance between the scene object 105 and a particular lens component of the lens assembly 110, between the scene object 105 and the image sensor 130, etc.

In a typical imaging environment, there may be ambient light and/or probe lighting. For example, the scene object 105 can be illuminated by ambient sunlight, artificial environmental lighting (e.g., overhead lights in a room, lamps, etc.), lighting directed toward the scene object 105 by dedicated illumination components (e.g., components of a camera system including the lens assembly 110, image sensor 130, processor 140), etc. The light reflects off of one or more surfaces of the scene object 105, and some of the light is reflected in the direction of the lens assembly 110. For example, the lens assembly 110 includes an aperture (e.g., a natural aperture and/or mechanical aperture, etc.) through which the reflected light passes. Light passing through the lens assembly 110 can be focused, by the lens assembly 110, onto the image sensor 130.

Embodiments of the image sensor 130 include a large number of photodetector elements (e.g., pixels) arranged in any suitable manner. The photodetector elements can lie in a detection plane 132. In some implementations, the photodetector elements are arranged in an array. The photodetector elements are responsive to multiple chromatic components of the reflected light. For example, each pixel can include photodetector elements responsive to red light, green light, and blue light. The photodetector elements can be configured to respond to any suitable chromatic components (e.g., colors), such as particular frequency sub-band in the optical band, infrared and/or ultraviolet sub-bands, etc. When light beams of a particular chromatic component intersect with the detection plane 132 (i.e., with the photodetectors), the interaction can generate a magnitude of response in the photodetectors corresponding to that chromatic component. For example, a photodetector configured to detect blue light can produce a magnitude of optical response corresponding to an intensity of blue light interacting with the photodetector in its associated location on the image sensor 130. The responses of the photodetector elements can be interpreted as optical information and used to generate images of the scene object 105.

Figure 2:
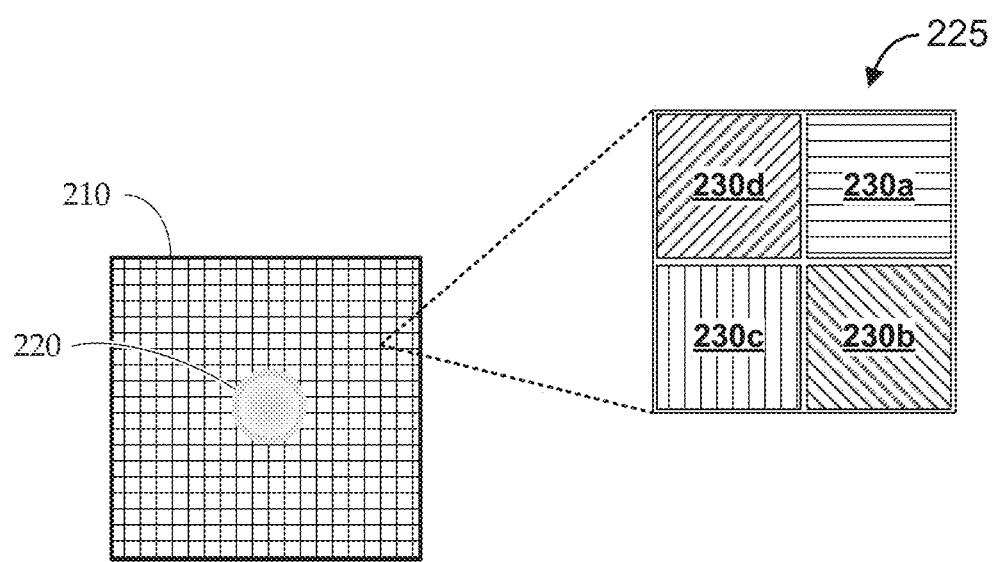
FIG. 2 shows an example of a photodetector array of an image sensor, along with an illustrative photodetector pixel, according to various embodiments.

FIG. 2 shows an example of a photodetector array 210 of an image sensor, along with an illustrative photodetector pixel 225, according to various embodiments. The photodetector array 210 can include an array of any suitable photodetector elements, each for detecting one or more chromatic components (e.g., colors) of light. Each photodetector element, or group of elements, generates an electrical output in response to interaction with light of the chromatic component. For example, when light within a particular frequency band illuminates a photodetector element configured to respond to that frequency band, the photodetector element and associated circuitry outputs an electrical signal. The electrical signal can indicate an intensity of the light interacting with the photodetector element (e.g., signal strength can correlate to image brightness). For example, each photodetector element can be associated with a respective location in the detection plane 132 and/or a particular chromatic component, and the raw output data of the image sensor 130 can include intensity values for the chromatic components across the locations. In one implementation, the image sensor 130 generates, for each photodetector element, a 12-bit digital value corresponding to one of 4,096 possible detected intensity levels for a corresponding color.

The pixel 225 can be an implementation of a set of photodetector elements 230, of the image sensor 130 described with reference to embodiments herein. The illustrative pixel 225 includes four photodetector elements 230 (e.g., photodiodes). For example, the photodetector elements 230 are configured to detect light components in the visible spectrum and/or other optical spectra (e.g., near-infrared). In one implementation, the photodetector elements 230 are arranged according to a Bayer pixel pattern to include one red photodetector element 230 (i.e., one photodetector configured to detect a light component in the red band of the color spectrum), one blue photodetector element 230, and two green photodetector elements 230. In other implementations, other arrangements of photodetector elements 230 can be used to form the pixel 225. For example, a modified Bayer pixel pattern can be used, in which one of the green photodetector elements 230 is replaced by a near-infrared photodetector element 230. Though the illustrated pixel 225 includes four photodetector elements, each pixel 225 can include any suitable number of photodetector elements 230 of any suitable type. Further, different pixels 225 may have different numbers and/or types of photodetector elements 230.

Returning to FIGS. 1A and 1B, though it can be convenient to refer to a lens as having a particular focal length, lenses tend to focus different chromatic components to different respective focal lengths. For example, optical parts tend to have lower refractive indices (RI) at longer wavelengths. As such, the optics tend to bend shorter wavelengths more than longer wavelengths, manifesting as longer focal lengths for longer wavelengths. Further, magnification of a lens tends to be proportional to its focal length, such that a same object will tend to produce a larger image at a longer wavelength. Such phenomena are typical in many imaging systems, particularly where micro-lens components are used, as such components typically do not compensate for color differences with the optical parts themselves. Instead, in such systems, color differences are corrected with processing of detected optical data. For example, in digital cameras and other typical digital imaging environments, chromatic focal differences can be seen in raw detector data, but those differences are commonly corrected in hardware and/or software of the imaging system prior to outputting the data to other components.

In the environment 100, multiple focal planes are shown to illustrate example chromatic focal differences of the lens assembly 110. For reference, the environment 100 includes a nominal focal plane 115, which indicates an illustrative focal plane for substantially collimated light, such as light reflected from the scene object 105 when the object distance 107 is infinitely far away from the lens assembly 110. The environment 100 also includes a smaller-wavelength (e.g., blue) focal plane 120 of the lens assembly 110 and a larger-wavelength (e.g., red) focal plane 125 of the lens assembly 110. For example, light components below approximately 500 nanometers in wavelength (e.g., within a band of 450-485 nanometers) tend to be focused around the smaller-wavelength focal plane 120, while light components above approximately 600 nanometers in wavelength (e.g., within a band of 625-740 nanometers) tend to be focused around the larger-wavelength focal plane 125. Depending on the configuration of the lens assembly 110, the smaller-wavelength focal plane 120 and the larger-wavelength focal plane 125 may be closer together or farther apart, may be substantially co-planar with the nominal focal plane 115, etc.

Embodiments of imaging systems typically provide for focusing of the lens assembly 110 with respect to the detection plane 132. The focusing can seek to optimize one or more parameters, such as brightness, contrast, color balance, etc. In some embodiments, achieving such focusing involves mechanically adjusting the relative position of components of the lens assembly 110 and/or image sensor 130. As one example, the position of the image sensor 130 can be shifted toward, or away from, the lens assembly 110. As another example, components of the lens assembly 110 can be moved relative to each other and/or relative to the image sensor 130 to adjust the positions of one or more associated focal planes. The focusing can be manual and/or automatic. Many typical imaging systems with automatic focusing seek to position the detection plane 132 of the image sensor 130 in a location that maximizes color balance. Such a color-balanced position can also tend to correspond to a contrast-optimized imaging location. Because the larger-wavelength focal plane 125 is farther away from the lens assembly 110 than the smaller-wavelength focal plane 120, larger-wavelength light components tend to spread out more than smaller-wavelength light components prior to reaching the detection plane 132. As such, the color-balanced imaging location is typically closer to the smaller-wavelength focal plane 120 than to the larger-wavelength focal plane 125. For example, the color-balanced imaging location may be located approximately one-third of the distance from the smaller-wavelength focal plane 120 to the larger-wavelength focal plane 125. As illustrated, focusing of the smaller-wavelength light components onto the smaller-wavelength focal plane 120 forms a smaller-wavelength image 111 of the scene object 105 at the smaller-wavelength focal plane 120, and focusing of the larger-wavelength light components onto the larger-wavelength focal plane 125 forms a larger-wavelength image 113 at the larger-wavelength focal plane 125. As such, an image formed and detected at the detection plane 132 effectively includes a balance of the smaller-wavelength image 111 and larger-wavelength image 113.

The chromatic focal differences of the lens assembly 110 tend to be most apparent, and therefore most detectable, at edge locations of the scene object 105. For the sake of illustration, FIG. 1B shows illustrative raw detector images 150. The first raw detector image 150a is an image of edge Q (denoted as Q') of the scene object 105, and the second raw detector image 150b is an image of edge P (denoted as P') of the scene object 105. It can be seen in both images 150 that the blue image components tend to be focused toward the center of each image 150, and the red components tend to be focused around the outside of each image 150. As noted above, this is due at least to the chromatic differences in focal length manifesting as higher magnification for the larger (e.g., red) wavelengths.

Figure 3A:
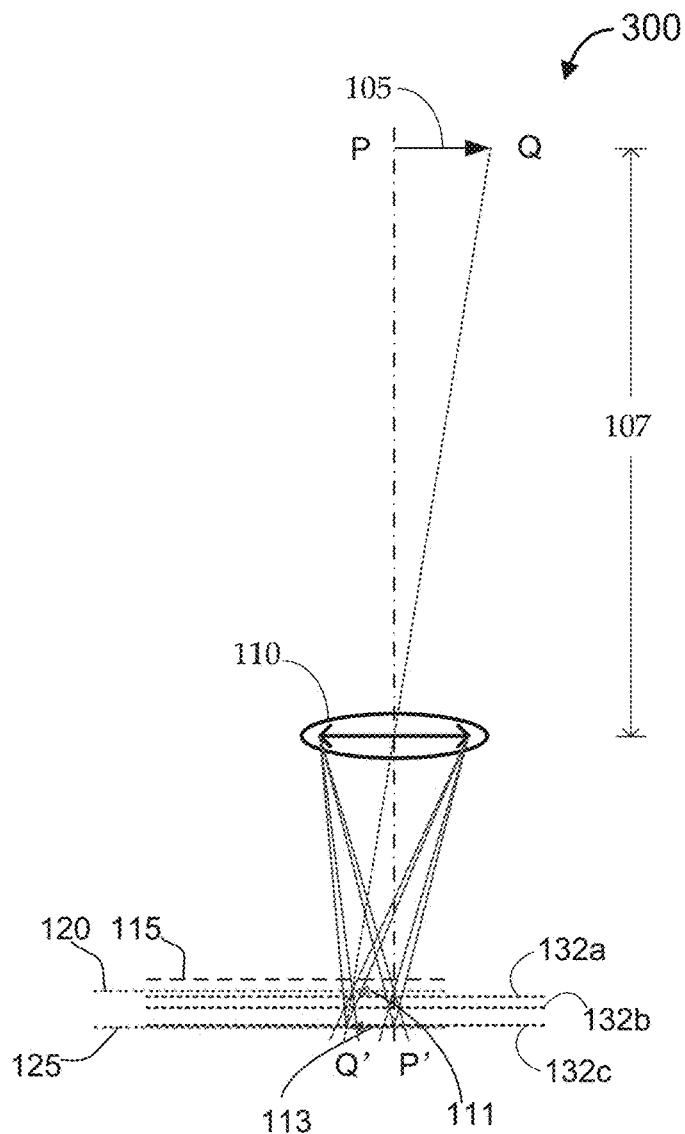
FIG. 3A shows another passive 3D image sensing environment, like the environment shown in FIG. 1A.
Figure 3B:
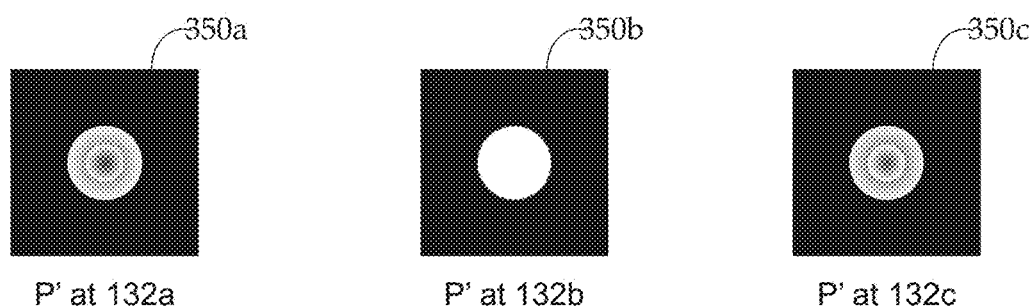
FIG. 3B shows example raw detector images for a white spot at edge "P" of FIG. 3A.
Figure 3C:
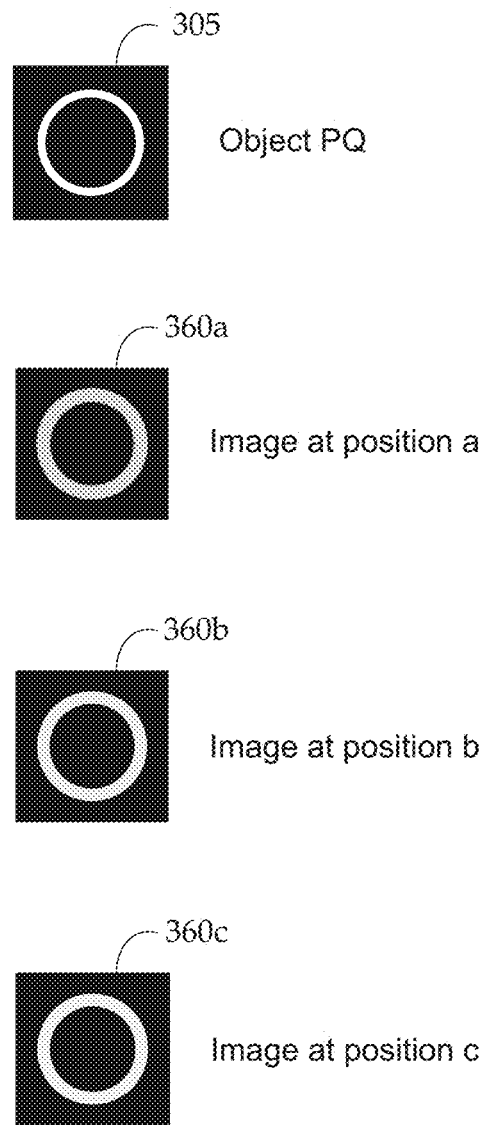
FIG. 3C shows an illustrative scene object and example raw detector images for the object in accordance with FIG. 3A.

The effects of chromatic differentiation are further clarified by FIGS. 3A-3C. FIG. 3A shows another passive 3D image sensing environment 300, like the environment shown in FIG. 1A. As described above, the environment 300 includes a lens assembly 110 and a detection plane 132 associated with an image sensor 130 (not shown). The processor 140 and memory 145 are not explicitly shown. The representative scene object 105 is again shown as located an object distance 107 away from the lens assembly 110 and as extending between edges "P" and "Q". The location and other characteristics of the lens assembly 110 can define the locations of a nominal focal plane 115, a smaller-wavelength focal plane 120, and a larger-wavelength focal plane 125. Three different locations are shown for the detection plane 132, all lying between the smaller-wavelength focal plane 120 and the larger-wavelength focal plane 125. A first detection plane 132a is shown very close to the smaller-wavelength focal plane 120, a second detection plane 132b is shown in a color-balanced location approximately one-third of the distance from the smaller-wavelength focal plane 120 to the larger-wavelength focal plane 125, and a third detection plane 132c is shown very close to the larger-wavelength focal plane 125.

FIG. 3B shows example raw detector images 350 for a white spot at edge "P." A first of the raw detector images 350a corresponds to the image sensor 130 positioned in accordance with detection plane 132a. With the detection plane 132a close to the smaller-wavelength focal plane 120, it can be seen that the smaller-wavelength light components are focused toward the center of the image 350a, and the larger-wavelength light components are spread toward the outside of the image 350a. A third of the raw detector images 350c corresponds to the image sensor 130 positioned in accordance with detection plane 132c. With the detection plane 132c close to the larger-wavelength focal plane 125, it can be seen that the larger-wavelength light components are focused toward the center of the image 350c, and the smaller-wavelength light components are spread toward the outside of the image 350c. A second of the raw detector images 350b corresponds to the image sensor 130 positioned in accordance with detection plane 132b. With the detection plane 132b in a color-balanced position, it can be seen that the color difference across most of the image 350b is minimized (e.g., even undetectable), and the larger-wavelength light components appear primarily in a small band around the outer edge of the image 350b. For example, some automatic color balancing techniques tend to effectively zoom out (e.g., move the detection plane 132 toward the smaller-wavelength focal plane 120) until the larger-wavelength light components appear at the edges of the image.

FIG. 3C shows an illustrative scene object 305 and example raw detector images 360 for the object. The scene object 305 is a white ring on a black background. Three raw detector images 360a, 360b, and 360c correspond to the image sensor 130 positioned in accordance with detection plane 132a, 132b, and 132c, respectively. For a continuous object surface, the image of each point tends to be affected by sub-images of all nearby points, such that neighboring points' sub-images at least partially overlap. This effect tends automatically to color-correct the image away from the edges, and the chromatic differences discussed herein tend to be detectable only at edges or other non-uniform positions of an object, accordingly. With the detection plane 132a close to the smaller-wavelength focal plane 120 in image 360a, the larger-wavelength light components are seen at the edges of the image 360a, and other portions of the image 360a can tend to favor the smaller-wavelength light components. With the detection plane 132c close to the larger-wavelength focal plane 125 in image 360c, the smaller-wavelength light components can be seen at the edges of the image 360c, and other portions of the image 360c can tend to favor the larger-wavelength light components (these effects may be relatively undetectable without using hardware and/or software). With the detection plane 132b in the color-balanced location, the color difference remains at a minimum across the image 360b.

Returning to FIGS. 1A and 1B, embodiments provide novel techniques for 3D image sensing based on passive optical techniques, particularly exploiting the types of chromatic focal differentiation described above. This chromatic focal differentiation can manifest as a difference in magnitude of chromatic response (MCR) (e.g., brightness) for different chromatic components. The inventors of embodiments described herein have recognized that these differences can be detected as a ratio between the MCR of one particular chromatic component and the MCR of another particular chromatic component, and that this ratio can be strongly correlated to the object distance 107.

Embodiments of the processor 140 can exploit this correlation to passively detect object distance based on detected differences in MCR. As described above, the image sensor 130 is in optical communication with the lens assembly 110 and includes photodetector elements. A first subset of the photodetector elements is configured to produce a first set of chromatic responses to a smaller-wavelength component of the received light, and a second subset of the photodetector elements is configured to produce a second set of chromatic responses to a larger-wavelength component of the received light. For example, some photodetector elements respond to blue light and others respond to red light. The processor 140 can receive raw image data from the image sensor 130 indicating the first set of chromatic responses and the second set of chromatic responses. For example, each photodetector element (e.g., each color detector in each pixel) can output to the processor 140 a 12-bit value indicating one of 4,096 levels of brightness detected for its respective color at its respective location. The processor 140 can include a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. In some implementations, the image sensor 130 is configured to pass raw optical information to the processor 140 via a bus, or in any other suitable manner. The processor 140 can compute a first magnitude of chromatic response (MCR) from the first set of chromatic responses and a second MCR from the second set of chromatic responses. For example, the processor 140 can determine an edge region for detection and can find a largest value for each chromatic component in that region. The processor 140 can then determine an object distance 107 of the scene object 105 based on a ratio between the first MCR and the second MCR. The determination can be based on calibration data and/or other data stored in memory 145 in communication with the processor 140, and/or based on one or more formulas describing a mathematical correlation between the ratio data and object distance 107.

FIGS. 1A and 3A show only a single scene object 105 for the sake of simplicity. However, scenes typically include multiple scene objects 105 at respective object distances 107, and/or a scene object 105 may have multiple features at different object distances 107. In some embodiments, the optical system (e.g., the lens assembly 110 and/or image sensor 130) is focused on a first scene object as a reference object, and the optical system is calibrated to that object. For example, as described above (e.g., as illustrated by images 350b and 360b in FIGS. 3B and 3C, respectively), embodiments can focus the lens assembly 110 and/or image sensor 130 so that the detection plane 132 is in a color-balanced location with respect to a particular object in the scene. For that object, the color difference is at a minimum (e.g., or is relatively small), and other objects and/or surfaces in the scene that are closer to, and/or farther from, the lens assembly 110 can be imaged according to embodiments herein to detect chromatic focal differences for distance measurement. Thus, embodiments can focus on, and calibrate according to, one object in a scene, and can then determine other object distances in the scene in accordance with that calibrated reference object distance.

Figure 4A:
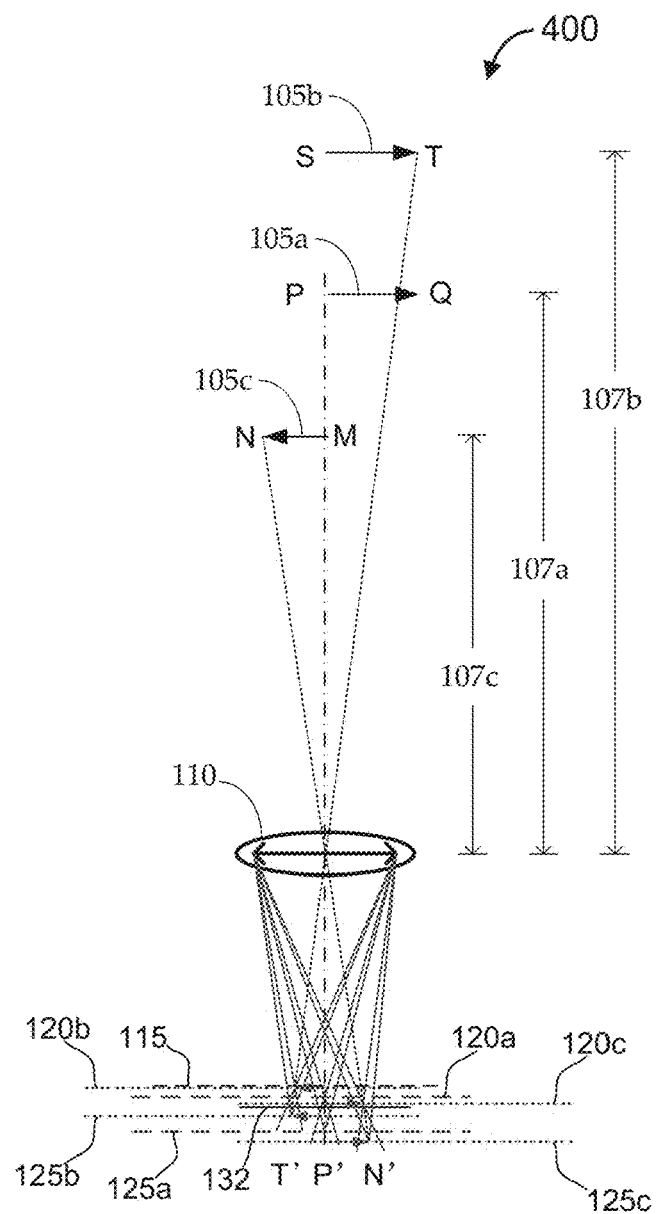
FIG. 4A shows another passive 3D image sensing environment with multiple scene objects at different object distances.
Figure 4B:
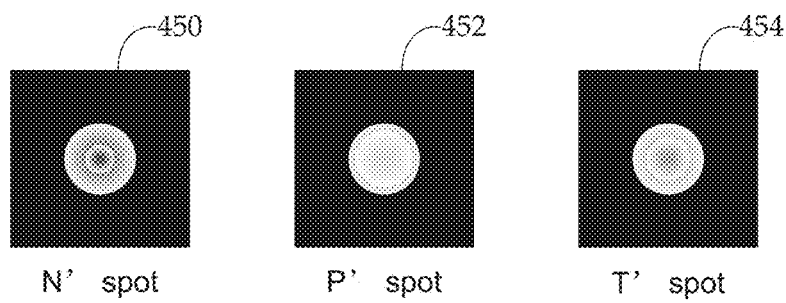
FIG. 4B shows representative raw detector images corresponding to the different scene objects in FIG. 4A.

FIG. 4A shows another passive 3D image sensing environment 400 with multiple scene objects 105 at different object distances 107; and FIG. 4B shows representative raw detector images corresponding to the difference scene objects 105. As described above, the environment 400 includes a lens assembly 110 and a detection plane 132 associated with an image sensor 130. The processor 140 and memory 145 are not explicitly shown. Three scene objects 105 are shown, each at an associated one of three object distances 107. A first scene object 105a is shown as located a first object distance 107a away from the lens assembly 110 and as extending between edges "P" and "Q". This first scene object 105a is illustrated as a reference object by which to focus and calibrate the lens assembly 110 and/or the image sensor 130. For example, automatic focusing and color-balancing of the lens assembly 110 and image sensor 130 cause the detection plane 132 to be positioned between (e.g., approximately one-third of the distance between) a reference smaller-wavelength focal plane 120a and a reference larger-wavelength focal plane 125a. As such, imaging of the reference scene object 105a yields a minimized (or relatively small) MCR ratio between smaller-wavelength light components and larger-wavelength light components. This can be seen in the color-balance of the illustrative raw detector image 452 of a white spot at edge "P" in FIG. 4B.

A second scene object 105b is shown as located a second object distance 107b away from the lens assembly 110, which is farther than the calibrated object distance 107a. The second scene object 105b extends between edges "S" and "T". Light reflecting off of the second scene object 105b from the second object position 107b is focused differently by the lens assembly 110 than the light originating from reflections at the calibrated object distance 107a. As such, the second scene object 105b is associated with its own second smaller-wavelength focal plane 120b and second larger-wavelength focal plane 125b. Because the second scene object 105b is farther away than the calibrated object distance 107a, the smaller-wavelength focal plane 120b and the larger-wavelength focal plane 125b tend to be shifted toward the nominal focal plane 115. This chromatic focal plane shift effectively shifts the relative position of the detection plane 132 to be closer to the larger-wavelength focal plane 125b for the second scene object 105b. As such, imaging of the second scene object 105b yields a higher MCR ratio with smaller-wavelength light components distributed over a wider area of the image. This can be seen in the color-balance of the illustrative raw detector image 454 of a white spot at edge "T" in FIG. 4B.

A third scene object 105c is shown as located a third object distance 107c away from the lens assembly 110, which is closer than the calibrated object distance 107a. The third scene object 105c extends between edges "M" and "N". Light reflecting off of the third scene object 105c from the third object position 107c is focused differently by the lens assembly 110 than the light originating from reflections at the calibrated object distance 107a. As such, the third scene object 105c is associated with its own third smaller-wavelength focal plane 120c and third larger-wavelength focal plane 125b. Because the third scene object 105c is closer than the calibrated object distance 107a, the smaller-wavelength focal plane 120c and the larger-wavelength focal plane 125c tend to be shifted away from the nominal focal plane 115. This chromatic focal plane shift effectively shifts the relative position of the detection plane 132 to be closer to the smaller-wavelength focal plane 125c for the third scene object 105b. As such, imaging of the third scene object 105c yields a higher MCR ratio with larger-wavelength light components distributed over a wider area of the image. This can be seen in the color-balance of the illustrative raw detector image 450 of a white spot at edge "N" in FIG. 4B.

For simplicity, some descriptions above assume detection of a white feature on a black background. However, novel techniques described herein can be implemented in any color context with proper chromatic calibration. In some cases, such chromatic calibration involves selecting chromatic components based on the scene colors. For example, if features are being detected on a blue background, techniques can compute and exploit MCR ratios between other color photodetectors (e.g., red and green photodetectors in a pixel), so that the background "blue" is effectively seen as an absence of color (i.e., black) to the detection system. Still, the colors in a particular scene are typically not optimal for detection of chromatic differentiation, as described herein. For example, if a blue object is in front of a red object in a scene, a pure blue-to-red MCR ratio may not yield accurate information for detection; regardless of the relative object distances, the red object will have overwhelmingly high MCR for red, and the blue object will have overwhelmingly high MCR for blue. As such, some embodiments chromatically calibrate object colors as part of the MCR computations to effectively calibrate out effects of the object color on the detection.

Figure 5:
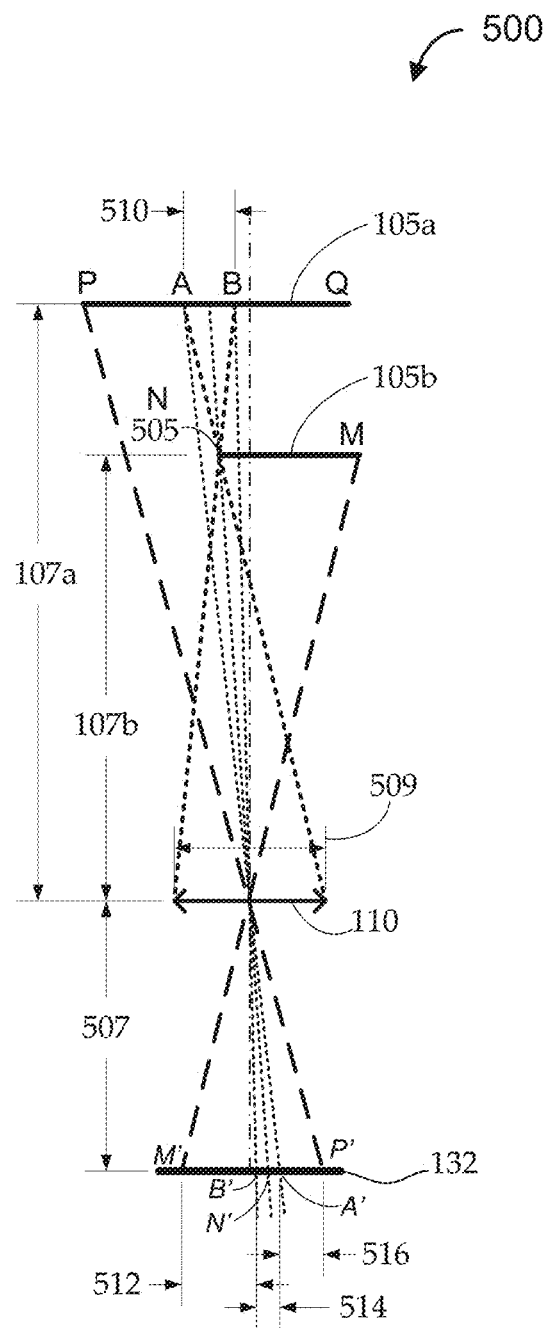
FIG. 5 shows another passive 3D image sensing environment with multiple scene objects at different object distances to illustrate chromatic calibration, according to various embodiments.

FIG. 5 shows another passive 3D image sensing environment 500 with multiple scene objects 105 at different object distances 107 to illustrate chromatic calibration, according to various embodiments. As described above, the environment 500 includes a lens assembly 110 and a detection plane 132 associated with an image sensor 130. The processor 140 and memory 145 are not explicitly shown. A first scene object 105a is shown as located a first object distance 107a away from the lens assembly 110 and as extending between edges "P" and "Q". This first scene object 105a is illustrated as a reference object (e.g., a background) by which to focus and calibrate the lens assembly 110 and/or the image sensor 130. For example, automatic focusing and color-balancing of the lens assembly 110 and image sensor 130 can be performed with reference to the first scene object 105a, such that imaging of the first scene object 105a yields a minimized (or relatively small) MCR ratio between smaller-wavelength light components and larger-wavelength light components. A second scene object 105b is shown as located a second object distance 107b away from the lens assembly 110 and as extending between edges "M" and "N". It is assumed that the system is seeking to compute a distance for edge "N" 505 (which corresponds in the Figure to object distance 107b), such that chromatic calibration is being performed for edge "N" 505.

As described above, distance measurements herein are calibrated based on detecting chromatic differentiation for a reference object, which can include color balancing the imaging system with respect to the reference object. For the sake of simplicity, some descriptions above assume that other objects for which distance is being measured are chromatically comparable; that each detected feature is the same color and is being imaged relative to a same color background. For example, FIGS. 4A and 4B assume a white spot on a background at multiple distances. However, the MCR ratios may be different for two objects with different edge colors and/or background colors, even when the objects are at a same object distance. As such, in some cases, obtaining accurate distance measurements using the techniques described herein can rely on calibrating out such differences in feature and/or background color. In the illustrated case of FIG. 5, chromatic calibration is being applied to edge "N" 505 to determine, and calibrate out, a feature color for edge "N" 505 and a background color behind edge "N" 505.

To find the relevant chromatic calibration information, embodiments detect the background color as the color of scene object 105a (or at least the color of a portion of scene object 105a close to a feature imaging region), and detect the feature color as the color of scene object 105b (or at least the color of a portion of scene object 105a close to the feature imaging region). To that end, embodiments determine multiple regions of interest at the detection plane 132, including at least the feature imaging region 514 in which the desired feature can be seen on its background, a background color calibration region 516, and a feature color calibration region 512. These regions relate to characteristics of optical components, relative distances of the scene objects 105, and/or other factors. The lens assembly 110 has an effective aperture diameter 509 and, after focusing and/or color balancing, is located a lens-to-detector distance 507 from the detection plane 132. As illustrated, the effective aperture diameter 509 and lens-to-detector distance 507 effectively define a background object region 510 (shown extending between "A" and "B") as the background of edge "N" 505 that will be seen at the detection plane 132 in the feature imaging region 514. As such, feature imaging region 514 is shown as extending between A' and B', which are projections of "A" and "B" onto the detection plane 132. Some or all of a remaining image of scene object 105a (i.e., any portion of the area between "A" and "P") can be used as the background color calibration region 516. As such, background color calibration region 516 is shown as extending between A' and P', which are projections of "A" and "P" onto the detection plane 132 (e.g., though only a proximate portion of that region may be used for calibration, such as where the color changes over the region). Some or all of a remaining image of scene object 105b (i.e., any portion of the area between "B" and "M") can be used as the feature color calibration region 512. As such, feature color calibration region 512 is shown as extending between B' and M', which are projections of "B" and "M" onto the detection plane 132 (e.g., though only a proximate portion of that region may be used for calibration, such as where the color changes over the region). With the regions defined according to the above, the feature color for edge "N" 505 can be calibrated based on the color of scene object 105b, and the background color for edge "N" 505 can be calibrated based on the color of scene object 105a.

In one implementation, the image sensor 130 is an array of pixels, each having a red (R), green (G), blue (B), and near-infrared (IR) photodetector. The output signal of each photodetector of each pixel corresponds to a particular physical location in the array (denoted by an "x" and "y" location) and a detected intensity of its respective chromatic component. Each output signal is also dependent on one or more of a determined color of scene object 105a (C1), a determined color of scene object 105b (C2), the effective aperture diameter 509 (D), the lens-to-detector distance 507 (S'), the object distance 107a of scene object 105a (S1), and the object distance 107b of scene object 105b (S2). For example, in the background color calibration region 516, the photodetector output signals for a particular pixel can be defined as:

R1=R1(x, y, C1, D, S1, S');
G1=G1(x, y, C1, D, S1, S');
B1=B1(x, y, C1, D, S1, S');
IR1=IR1(x, y, C1, D, S1, S').

In the feature color calibration region 512, the photodetector output signals for a particular pixel can be defined as:

R2=R2(x, y, C2, D, S2, S');
G2=G2(x, y, C2, D, S2, S');
B2=B2(x, y, C2, D, S2, S');
IR2=IR2(x, y, C2, D, S2, S').

In the feature imaging region 514, the photodetector output signals for a particular pixel can be defined as:

R=R(x, y, C1, C2, D, S1, S2, S');
G=G(x, y, C1, C2, D, S1, S2, S');
B=B(x, y, C1, C2, D, S1, S2, S');
IR=IR(x, y, C1, C2, D, S1, S2, S').

While the illustrations show scene object 105a and scene object 105b as having different object distances 107, this may not be the case. For example, where an object has a non-uniform area, marks, multiple edges, etc., scene object 105b can refer to a feature on scene object 105a having a detectable edge. In such a case, object distance 107a and object distance 107b are substantially equal (or precisely equal). Techniques described herein can still work in such a case. For example, S1 and S2 can be equal in the illustrative pixel signal output functions described above, and the chromatic calibration can still work.

In some cases, large regions of an object can be without sufficient features for distance measurement. For example, a large, relatively smooth surface of an object may span a range of distances, but without any clearly detectable edges or reliably detectable changes in color. In these and other cases, embodiments can project probe illumination into the scene to add chromatically differentiable features to the scene. As one example, a bright spot in a relatively low-light environment can chromatically add an edge to the scene for use in detection. As another example, spot illumination of an optical frequency that is absent from, or uncommon in, the scene (e.g., near infrared light) can be used to add a chromatic edge to the scene. Such an addition of probe illumination can include projecting a single spot, projecting multiple spots (e.g., an array), projecting an illuminated pattern, scanning one or more illumination features over an area, etc.

As noted herein, various implementations involve one or more types of calibration. For example, the relationships between MCR ratios between different chromatic components and object distance 107 are not absolute and fixed. Rather, those relationships are functionally related at least to system configuration parameters. For example, the same MCR values and/or ratios can correspond to different object distances 107 for objects of different colors, when calibrated to reference objects at different distances, when optical components are differently focused and/or color-balanced, etc. For the sake of illustration, in a typical implementation, the optical system can first auto-focus and auto-color-balance with respect to a particular reference object, thereby automatically configuring the lens assembly 110 and the image sensor 130 in a manner that defines locations of at least the nominal focal plane 115, the smaller-wavelength focal plane 120, and the larger-wavelength focal plane 125 for the reference object. Finding distances of one or more other objects in the scene using chromatic differentiation techniques described herein involves applying a particular set of relationships between MCR ratios and object distances that correspond to the auto-focused and auto-color-balanced configuration of the optical system.

Thus, the processor 140 can account for these conditions when computing object distance 107. As described above, embodiments of the processor 140 can receive raw image data from the image sensor 130 indicating chromatic responses for different chromatic components (e.g., colors), MCRs based on the chromatic responses, and determine object distances of one or more scene objects based on ratios between the MCRs. In some embodiments, the processor 140 is aware of a present optical configuration, such as including a present configuration of the lens assembly 110 and/or image sensor 130 for focus and color-balancing. For example, the configuration is associated with a set of parameter values updated in a register, or other suitable storage; and the processor 140 can query the present optical configuration by obtaining the updated values. In some such embodiments, the processor 140 is programmed to implement a pre-determined mathematical correlation (e.g., a functional relationship) between object distance 107 and MCR ratio. In some such embodiments, one or more such mathematical correlations are stored in the memory 145. For example, different optical configurations may be manifest different, but still deterministic, mathematical correlations; and an appropriate correlation (e.g., particular scalar values for a polynomial function, a particular function, etc.) is retrieved from the memory 145 in accordance with the present optical configuration. In other embodiments, the memory 145 is used to store some or all associations between MCR ratio and object distance 107 for one or more optical configurations. For example, the processor 140 determines object distance 107 according to a lookup table, or the like, stored in a memory 145 accessible to the processor 140 (e.g., any suitable on-board or off-board, non-transient, processor-readable memory). As used herein, a lookup table generally refers to any associative data structure in which each of a first set of values can be associated with a respective one of a second set of values. Data stored in the memory 145 (e.g., lookup table data, mathematical correlation data, etc.) can be stored to the memory 145 as part of a pre-calibration. For example, prior calibration with targets of known color at known distances can be used to generate the data stored in the memory 145 and used by the processor 140.

The various optical systems illustrated and described above use chromatic differentiation to determine object distances for one or more objects in a scene of the optical system. In some implementations, a single object distance is determined. In other implementations, multiple discrete object distances are determined for multiple discrete locations in the scene. In other implementations, distance measurements across the scene are used to generate a depth map for the scene. Any of these and/or other implementations can be used to support a variety of three-dimensional (3D) imaging environments. For example, the types of 3D information that can be obtained by embodiments described herein can be used for 3D photography, 3D biometrics (e.g., 3D face identification), 3D vision for robots, 3D mapping for autonomous vehicles, range finding, etc. In some embodiments, systems for implementing the novel 3D imaging described herein (e.g., including the lens assembly 110, image sensor 130, processor 140, memory 145, etc.) can be integrated into a computational system, such as part of a computer, digital camera, smart phone, or other device.

Figure 6:
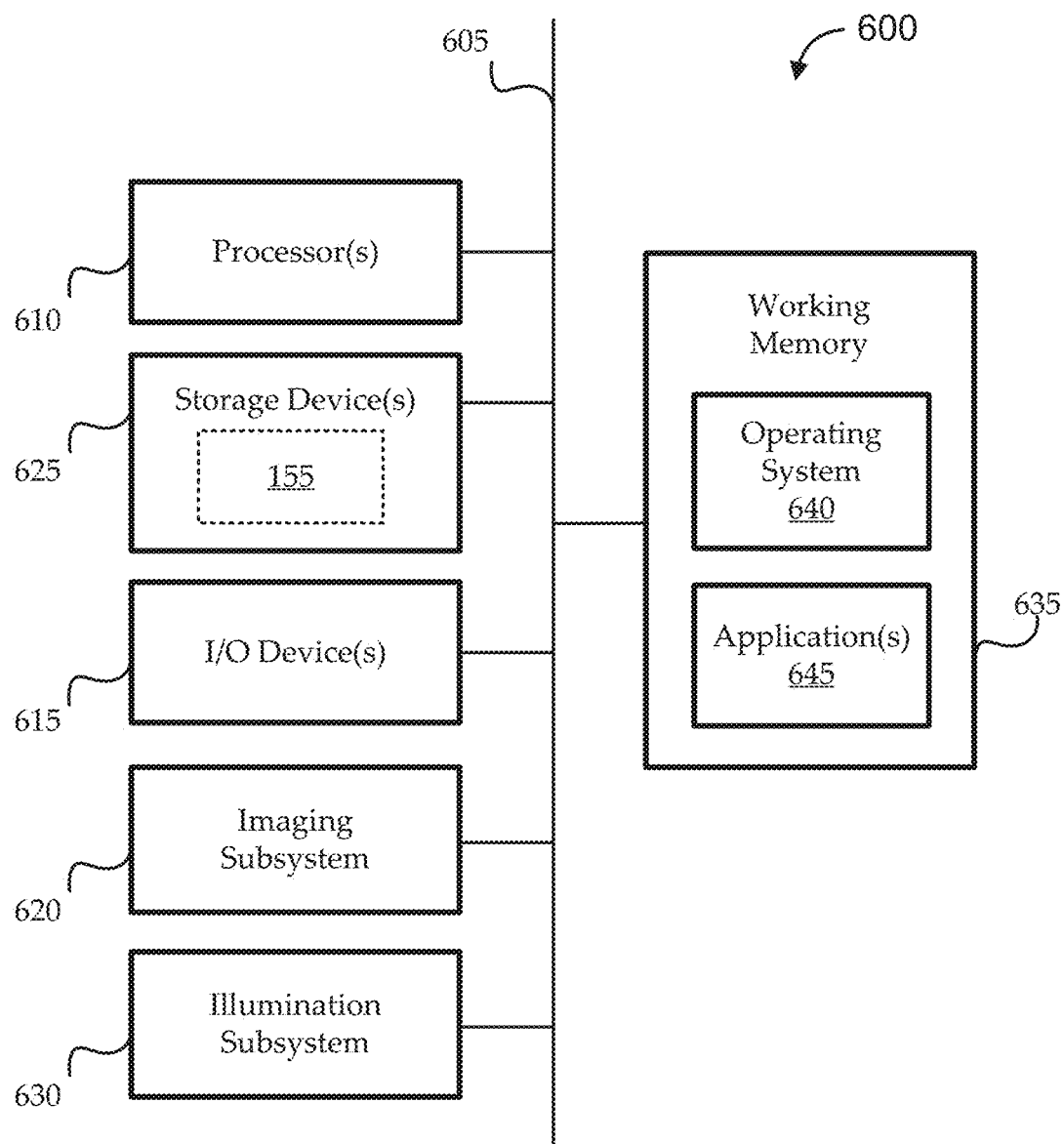
FIG. 6 provides a schematic illustration of one embodiment of a computer system that can implement various system components and/or perform various steps of methods provided by various embodiments.

FIG. 6 provides a schematic illustration of one embodiment of a computer system 600 that can implement various system components and/or perform various steps of methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown including hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, video decoders, and/or the like). For example, processors 610 can implement processor 140 shown in FIG. 1A. Some embodiments include one or more input/output (I/O) devices 615. In some implementations, the I/O devices 615 include human-interface devices, such as buttons, switches, keypads, indicators, displays, etc. In other implementations, the I/O devices 615 include circuit-level devices, such as pins, dip-switches, etc. In some implementations, the computer system 600 is a server computer configured to interface with additional computers and/or devices, such that the I/O devices 615 include various physical and/or logical interfaces (e.g., ports, etc.) to facilitate hardware-to-hardware coupling, interaction, control, etc.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 625 include memory 145 of FIG. 1A for storing calibration information, and/or any other suitable information, and/or instructions for implementing features described herein.

The computer system 600 can also include, or be in communication with, any other components described herein. In some embodiments, the computer system 600 includes an imaging subsystem 620. The imaging subsystem 620 can include the image sensor 130 and any supporting components. In some embodiments, the computer system 600 includes an illumination subsystem 630. The illumination subsystem 630 can include any suitable illumination sources for projecting normal illumination and/or reference illumination into a field of view of the imaging subsystem 620, and any supporting components. In some such embodiments, the illumination subsystem 630 includes one or more of illumination sources to provide reference illumination flooding and/or to provide one or more types of probe illumination. Some embodiments can include additional subsystems, such as a communications subsystem (not shown) to communicatively couple with other systems, networks, etc.

Embodiments of the computer system 600 can further include a working memory 635, which can include a RAM or ROM device, as described herein. The computer system 600 also can include software elements, shown as currently being located within the working memory 635, including an operating system 640, device drivers, executable libraries, and/or other code, such as one or more application programs 645, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. A set of these instructions and/or codes can be stored on a non-transitory computer-readable storage medium, such as the non-transitory storage device(s) 625 described above. In some cases, the storage medium can be incorporated within a computer system, such as computer system 600. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 600 and/or can take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which can be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 can cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media can be involved in providing instructions/code to processor(s) 610 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 600.

Figure 7A:
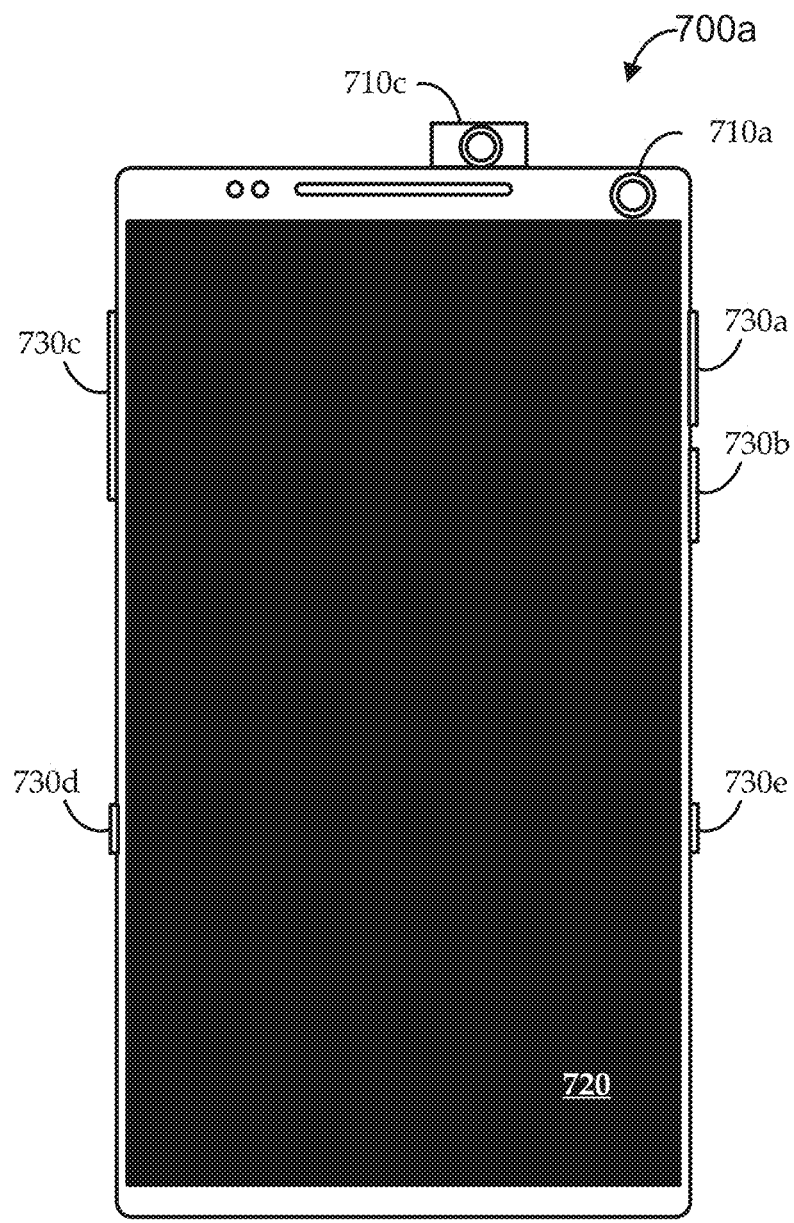
FIGS. 7A and 7B show front and side views, respectively, of an illustrative portable personal electronic device (PPED), according to various embodiments.
Figure 7B:
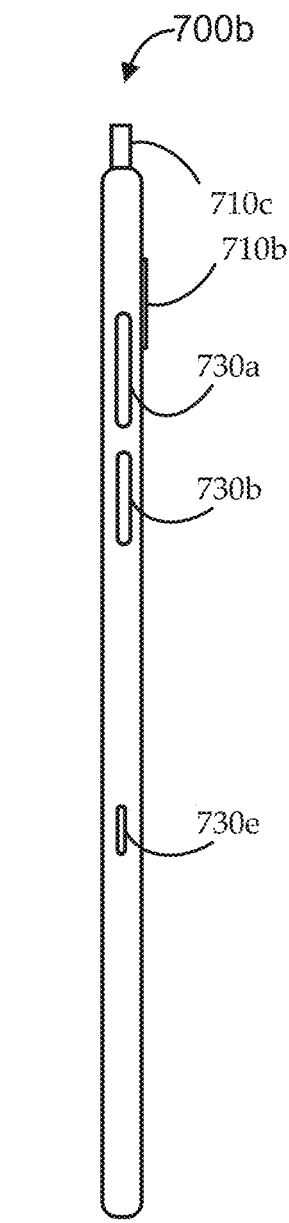

In some embodiments, systems for implementing the novel 3D imaging described herein, such as some or all of the computational system 600 of FIG. 6, can be integrated into an electronic device having a camera, such as a portable personal electronic device (PPED). FIGS. 7A and 7B show front and side views, respectively, of an illustrative portable personal electronic device (PPED) 700, according to various embodiments. As used herein, a PPED can include a smartphone, tablet computer, laptop computer, smart wearable device (e.g., a smartwatch), or any other suitable device that has one or more integrated digital imaging systems 710. Embodiments of the PPED 700 can also include one or more displays 720. Though not explicitly shown, some embodiments of the display 720 can have, integrated therewith, capacitive touchscreen elements, another digital imaging system 710, a fingerprint sensor, and/or other components. User interface components can also include one or more physical buttons 730. For example, the physical buttons 730 can include a power button, volume buttons, etc. In some implementations, one or more of the buttons is dedicated to a particular function, and one or more of the buttons is dynamically assignable (e.g., by an application processor and/or other components) to various functions. Though not shown, the PPED 700 can include additional user interface components, such as optical sensors, force sensors, biometric sensors, accelerometers, etc.

One or more (e.g., all) of the digital imaging systems 710 can include a passive 3D optical sensing system. The passive 3D optical sensing system(s) are configured to support capturing of depth information to support three-dimensional features of camera(s) and/or other components. For example, as illustrated, the PPED 700 can include a front-facing (e.g., selfie) digital imaging system 710a, a rear-facing digital imaging system 710b (shown in FIG. 7B), a pop-out digital imaging system 710c, and/or any other suitable integrated digital imaging systems 710. For example, a user desires to capture an image using one of the digital imaging systems 710. The PPED 700 initializes various hardware and software elements to enter an image acquisition mode. As part of the mode, a passive 3D optical sensing system is used to passively collect optical information from the scene in the field of view of the camera, and to determine one or more object distances, and/or generate a depth map of some or all of the scene. As described herein (e.g., with reference to FIGS. 1A, 3A, 4A, and 5), the optical information is passively received via various optics and sensors, including a lens assembly 110 and an image sensor 130, and can be processed by a processor 140 coupled with memory 145. In some embodiments, the one or more passive 3D optical sensing systems include, or take advantage of, one or more illumination sources, such as probe lighting sources. For example, the probe lighting sources can provide or supplement illumination having normal and/or reference light components. In some embodiments, the processor 140 and/or the memory 145 are dedicated components of the passive 3D optical sensing system. In other embodiments, the processor 140 is implemented by a processor of the PPED (e.g., a central processor, graphics processor, or other processor of the PPED, not specific to the passive 3D optical sensing system). In other embodiments, the memory 145 is implemented by memory of the PPED, such as removable or non-removable storage of the PPED not specific to the passive 3D optical sensing system.

Figure 8:
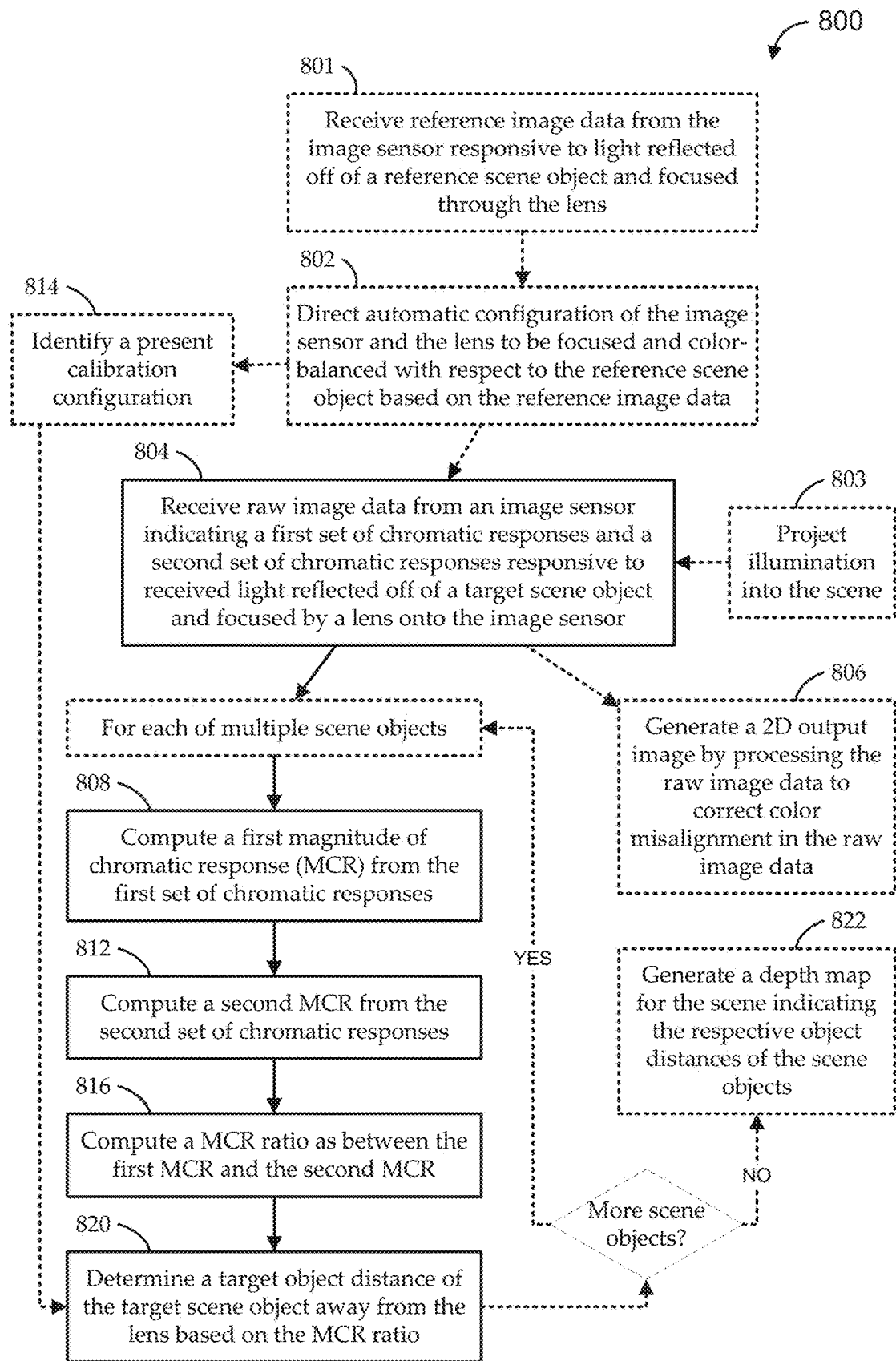
FIG. 8 shows a flow diagram of an illustrative method for passive three-dimensional imaging, according to various embodiments.

The various systems above can be used to perform various methods, such as those described below. FIG. 8 shows a flow diagram of an illustrative method 800 for passive three-dimensional imaging, according to various embodiments. Embodiments of the method 800 begin at stage 804 by receiving raw image data from an image sensor indicating a first set of chromatic responses and a second set of chromatic responses responsive to received light reflected off of a target scene object and focused by a lens onto the image sensor. A smaller-wavelength component of the received light is focused according to a target smaller-wavelength focal plane, and a larger-wavelength component of the received light is focused according to a target larger-wavelength focal plane. The first set of chromatic responses is produced by the image sensor responsive the smaller-wavelength component of received light, and the second set of chromatic responses is produced by the image sensor responsive to the larger-wavelength component of the received light. In some embodiments, the image sensor includes an array of photodetectors, a first portion of the photodetectors being responsive to the smaller-wavelength component of the received light (e.g., blue light), and a second portion of the photodetectors being responsive to the larger-wavelength component of the received light (e.g., red light).

In some embodiments, prior to the receiving at stage 804, the method 800 can project illumination into a field of view of the image sensor at stage 803. The illumination can include one or more spots, patterns, or any suitable illumination to produce one or more detection edge features in the field of view. In such embodiments, the target scene object can be one of the detection edge features. For example, if an object in the scene has an expansive surface with no suitably detectable features for chromatic differentiation, the illumination can provide the feature. Notably, this illumination is not intended to merely light up the detection area; rather, the illumination is to form a detectable feature in the scene.

The received raw image data can be used, as described herein, to generate 3D information according to at least stages 808-820, such as resulting in one or more object distances, a depth map, etc. Some embodiments, concurrent with (e.g., in parallel with) generating the 3D information, can generate a two-dimensional (2D) output image at stage 806 by processing the raw image data to correct color misalignment (e.g., and color-balance the data) in the raw image data. Some embodiments enable non-concurrent generation of the 3D and 2D information. For example, some or all of the raw image data is stored to a memory; and one of the 2D or 3D information is generated concurrent with the storing, while the other is generated at a later time.

At stage 808, embodiments can compute a first magnitude of chromatic response (MCR) from the first set of chromatic responses. At stage 812, embodiments can compute a second MCR from the second set of chromatic responses. In one implementation, the first MCR is computed as a maximum chromatic response (e.g., a maximum pixel signal output) to the smaller-wavelength component of the received light, and the second MCR is computed as a maximum chromatic response to the larger-wavelength component of the received light. In another implementation, the computation at stage 808 and/or 812 involves removing outliers, averaging, or otherwise determining an optimized one or more responses (e.g., pixels) to use as the corresponding MCR. At stage 816, embodiments can compute a MCR ratio as between the first MCR and the second MCR. In some implementations, the ratio is a ratio of the first MCR to the second MCR. In other implementations, the ratio is a ratio of the second MCR to the first MCR.

In some embodiments, additional chromatic responses can be received and/or used in the method 800. For example, a pixel may generate three or four chromatic responses (e.g., red, green, blue, and near-infrared). Some embodiments perform some or all of stages 808-816 using more than two chromatic responses. Other embodiments used the more than two chromatic responses to determine which two chromatic responses are most optimal for stages 808-816. For example, if it is determined that the background of a scene object is close to one of the chromatic responses, others of the chromatic response can be used in stages 808-816, thereby effectively rendering the background as black.

At stage 820, embodiments can determining a target object distance of the target scene object away from the lens based on the MCR ratio computed in stage 816. In some embodiments, the received light in stage 804 includes light reflected off of multiple scene objects (including the target scene object). For each of the plurality of scene objects, a respective portion of the smaller-wavelength component of the received light is focused to a respective smaller-wavelength focal plane corresponding to a respective object distance of the scene object away from the lens, and a respective portion of the larger-wavelength component of the received light is focused to a respective larger-wavelength focal plane corresponding to the respective object distance of the scene object. In such embodiments, the computing at stages 808 and 812 can include computing, for each scene object, a respective first MCR from the first set of chromatic responses and a respective second MCR from the second set of chromatic responses; and the determining at stage 816 can include determining, for each scene object, the respective object distance of the scene object based on a respective ratio between the respective first MCR and the respective second MCR. Some such embodiments, at stage 822, can generate a depth map for a scene including the scene objects, the depth map indicating the respective object distances of the scene objects. For example, stages 808-820 can be performed iteratively for the multiple scene objects until no more objects remain, after which the depth map can be generated at stage 822.

In some embodiments, the method 800 begins at stage 801 (e.g., prior to stages 804, 808, 812 and/or 816) by receiving reference image data from the image sensor responsive to light reflected off of a reference scene object and focused through the lens. The reference scene object is different from the target scene object and may be at the same or a different object distance away from the lens. In such embodiments, at stage 802, embodiments can direct automatic configuration of the image sensor and the lens to be focused and color-balanced with respect to the reference scene object based on the reference image data, thereby defining a reference smaller-wavelength focal plane and a reference larger-wavelength focal plane based at least on a reference distance of the reference scene object away from the lens. In some such embodiments, at stage 814, the method 800 can identify a present calibration configuration associated with directing the automatic configuration in stage 802. In such an embodiment, the present calibration condition corresponds to one of multiple predetermined calibration conditions. In such embodiments, determining the target object distance at stage 820 can involve associating the MCR ratio with the target object distance in accordance with a pre-calibrated correlation associated with the present calibration configuration. In some implementations, each of the calibration conditions is associated with a respective set of pre-calibrated parameter values for a shared set of parameters, and the pre-calibrated correlation is defined at least partially as a function of the shared set of parameters. In such implementations, determining the target object distance at stage 820 can involve computing the pre-calibrated correlation as a function of the respective set of pre-calibrated parameter values associated with the present calibration configuration. In other implementations, determining the target object distance at stage 820 can involve retrieving one of a respective number of mappings associated with the present calibration in a lookup table. The lookup table can define, for each of the calibration conditions, a respective number of mappings between calibrated MCR ratios and calibrated object distances. Such implementations can identify one of the calibrated MCR ratios as corresponding to the MCR ratio, and can map the one of the calibrated MCR ratios to one of the calibrated object distances according to the one of the respective number of mappings associated with the present calibration in the lookup table.

Passive Image Depth Sensing For Object Verification

As described above, passive three-dimensional image sensing techniques can be implemented based on chromatic differentiation. Light reflected off of an object can be focused by a lens onto an image sensor, and different chromatic components of the reflected light can be focused according to different focal lengths. Typically, the image sensor can be pre-focused (e.g., auto-focused) according to a particular chromatic component (e.g., wavelength). As such, raw image data detected by the image sensor can reveal that other chromatic components (in wavelengths that are larger or smaller than the focused component) are out of focus, resulting in chromatic differentiation between the image signatures detected by different photodetectors of the image sensor.

Figure 9:
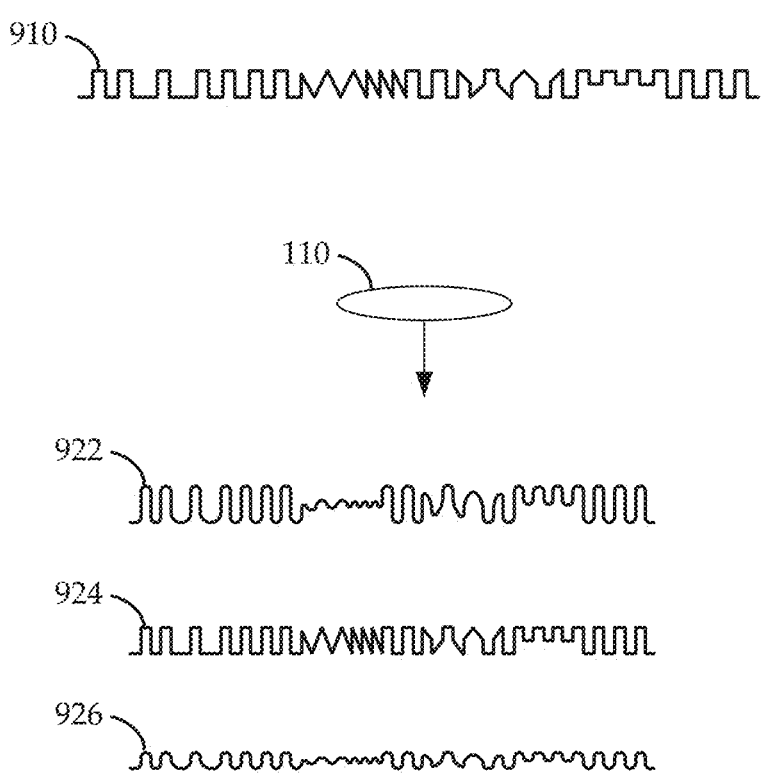
FIG. 9 shows an illustrative set of chromatic response signatures to an imaged object profile.

For example, FIG. 9 shows an illustrative set of chromatic response signatures to an imaged object profile 910. Light reflects off of the object profile 910 and is focused through a lens 110 onto photodetectors sensitive to different chromatic components, such as different wavelengths. Typically, an image sensor pixel can include at least one short-wavelength photodetector element (e.g., a "blue" photodetector), one medium-wavelength photodetector element (e.g., a "green" photodetector), and one long-wavelength photodetector element (e.g., a "red" photodetector). Some such pixels include additional photodetector elements, such as an additional "green" photodetector element, and/or a photodetector element to detect wavelengths outside the visible spectrum (e.g., near-infrared).

As described above, when the image sensor captures an image of the object profile 910, each photodetector element generates a respective signal level, such that groups of corresponding photodetector elements (e.g., all, or a particular subset, of the short-wavelength photodetector elements in a photodetector array of the image sensor) together generate a respective chromatic response signature. The respective chromatic response signature is effectively the image of the object profile 910 as detected for a particular chromatic component of the received light. The illustrated illustrative set of chromatic response signatures shows a short-wavelength chromatic response signature 922, a medium-wavelength chromatic response signature 924, and a long-wavelength chromatic response signature 926.

The illustrative set of chromatic response signatures indicate that the system (e.g., the lens 110 and/or the image sensor detection plane) have been focused in accordance with the medium-wavelength chromatic component, as the medium-wavelength chromatic response signature 924 can be seen to most closely represent the object profile 910. It is typical to focus imaging systems toward the middle of the visible spectrum, as the human eye tends to be more sensitive to light closer to the middle of the visible spectrum. With such focusing, it can further be seen that the short-wavelength chromatic response signature 922 and the long-wavelength chromatic response signature 926 are both out of focus (i.e., each is a less faithful representation of the object profile 910 than that of the medium-wavelength chromatic response signature 924), and that each of the short-wavelength chromatic response signature 922 and the long-wavelength chromatic response signature 926 is differentiable.

Figure 10:
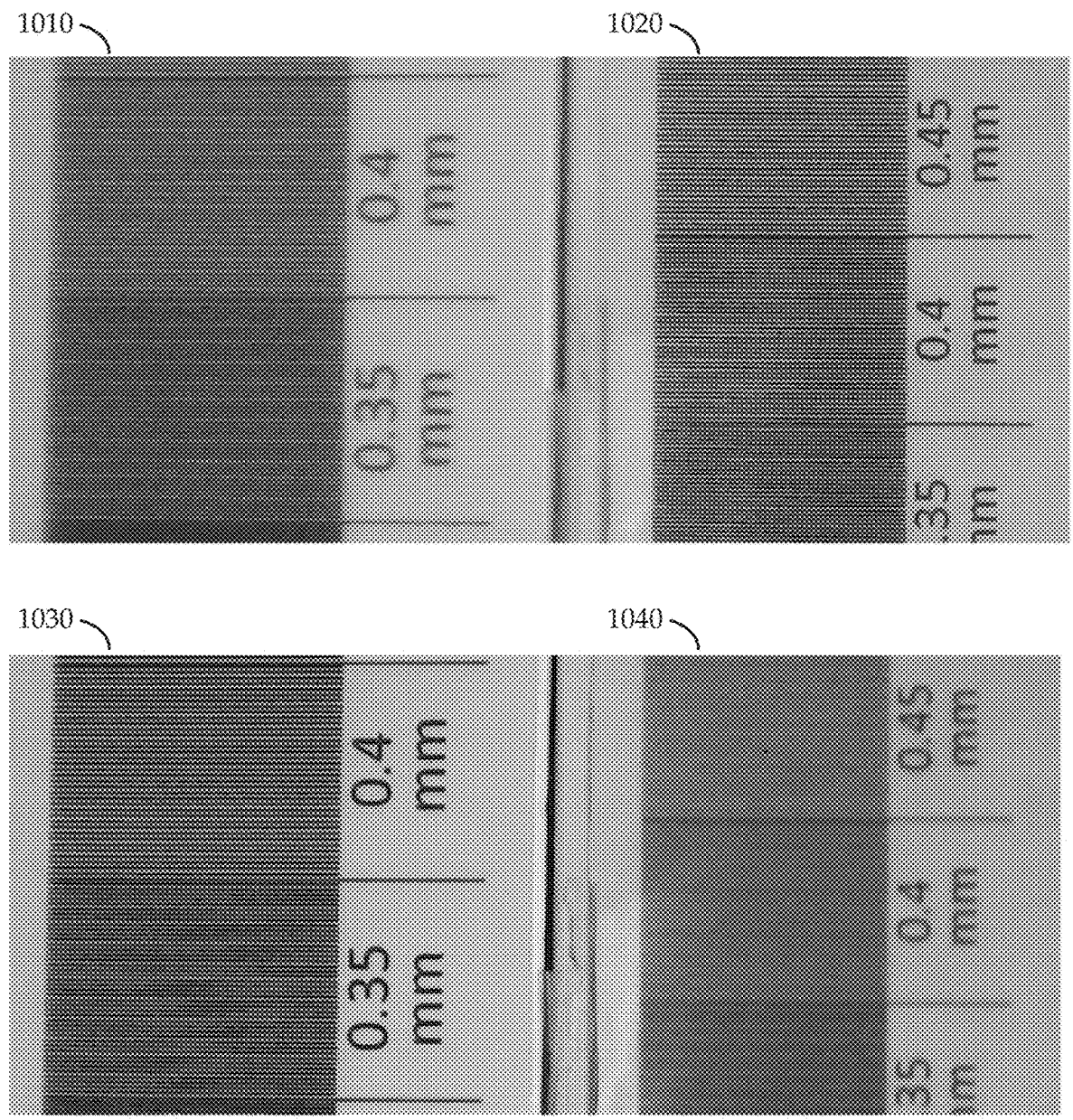
FIG. 10 shows a bar drawing as imaged under different experimental chromatic conditions.

Effects of such chromatic differentiation are further illustrated by FIG. 10, which shows a bar drawing as imaged under different chromatic conditions. The bar drawing shows a set of high-contrast lines precisely spaced apart. In a first experimental setup illustrated by first and second images 1010 and 1020, the imaging system is focused according to 940-nanometer-wavelength illumination. The first image 1010 is of the bar drawing placed 400 millimeters from the lens and imaged under 940-nanometer-wavelength illumination, and the second image 1020 is of the bar drawing placed 455 millimeters from the lens and imaged under the same 940-nanometer-wavelength illumination. It can be easily seen even with the human eye that the second image 1020 is appreciably sharper than the first image 1010 (i.e., the farther image is clearer), even though the first image 1010 and the second image 1020 only represent a 55-millimeter difference in distance.

A second experimental setup, illustrated by third and fourth images 1030 and 1040, uses the same focal wavelength and the same object distances, and varies only the illumination wavelength. Again, the imaging system is focused according to 940-nanometer-wavelength illumination. The third image 1030 is of the bar drawing placed 400 millimeters from the lens as in the first image 101, but the bar drawing is now imaged under 850-nanometer-wavelength illumination. The fourth image 1040 is of the bar drawing placed 455 millimeters from the lens as in the second image 1020, but the bar drawing is now imaged under the 850-nanometer-wavelength illumination. Now, it can be easily seen even with the human eye that the third image 1030 is appreciably sharper than the fourth image 1040 (i.e., the closer image is clearer), even though the third image 1030 and the fourth image 1040 only represent a 55-millimeter difference in distance.

The experimental results illustrated in FIG. 10 demonstrate at least three related effects of chromatic differentiation that can be exploited by embodiments described herein. First, the results demonstrate that the imaging system can be focused to a particular focal length according to a particular chromatic component, such that changing a distance of the object from the lens (i.e., the object depth) can cause a detectable change in focus. For example, in the experimental setup, the same object is imaged at the same wavelength, but the image sharpness changes with changes in the object distance. Second, the results demonstrate that different chromatic components tend to focus according to different focal lengths. For example, in the experimental setup, 940-nanometer-wavelength illumination is associated with a focal length of approximately 455 millimeters, and 850-nanometer-wavelength illumination is associated with a focal length of approximately 400 millimeters. As such, images of the same object at the same distance under different illumination wavelengths have detectably different clarity. Third, the results demonstrate that changing a distance of the object from the lens causes features of the object, as imaged, to change in size. For example, refocusing the imaging system according to different particular chromatic components does not appear to appreciably impact this result. For example, in the experimental setup, images 1010 and 1030 (both representing an object distance of 400 millimeters) show appreciably larger features than those of images 1020 and 1040 (both representing an object distance of 455 millimeters), even though the illumination wavelength changes from images 1010 and 1020 to images 1030 and 1040.

As described herein, embodiments can use the above effects, including changes in image sharpness and feature size over different focal wavelengths and object distances, to support features for passive image depth sensing for object verification. As used here, "object verification" can include verification that an object is real and/or biometric verification of an identity associated with the object. For example, applying passive imaging techniques described herein to a user's face can provide information about relative feature locations and/or sizes (e.g., locations and or sizes of pores, moles, eyebrows, eye irises, eye corners, eyelashes, eyelids, nose features, mouth features, lip features, etc.), relative depth of feature regions (e.g., relative depths of nose tip, cheeks, chin, forehead, etc.), absolute depth of one or more features, three-dimensional textural signatures of skin regions (e.g., texture of skin on the cheek, etc.), and/or other information.

In some embodiments, passive image depth sensing for object verification includes computing, for each of multiple characteristic sub-images corresponding to three-dimensional (3D) feature regions of an object, a respective set of feature depth measurements based on multiple differentiated chromatic components of raw image sensor data captured from the object. A verification signal can then be generated and output as a function of comparing the respective sets of feature depth measurements from the plurality of characteristic sub-images to previously stored feature depth expectations. As such, the verification signal can indicate whether an identity of the object is verified and/or whether the object is a spoof.

Figure 11:
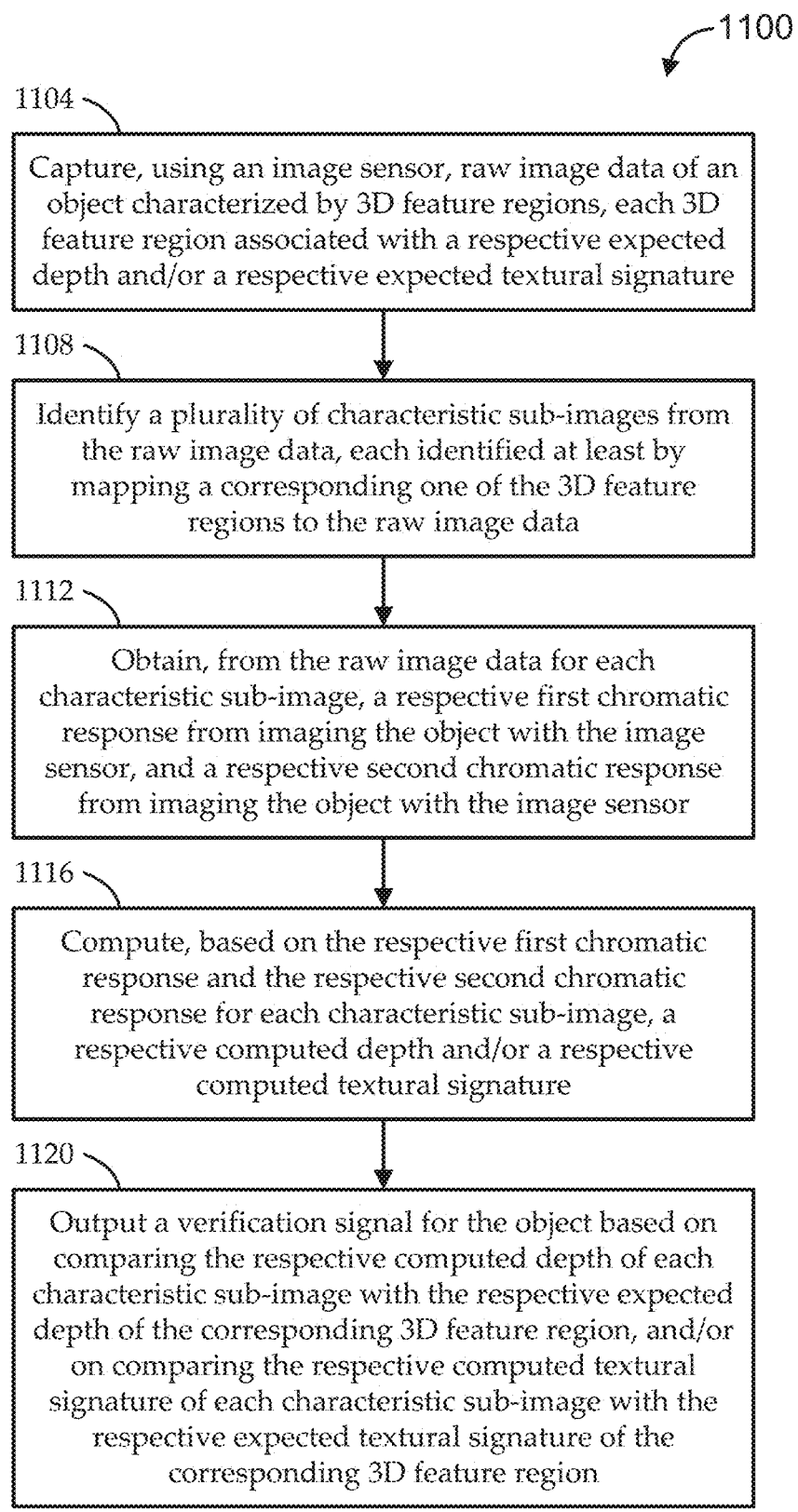
FIG. 11 shows a flow diagram of an illustrative method for passive image depth sensing for object verification, according to various embodiments.

FIG. 11 shows a flow diagram of an illustrative method 1100 for passive image depth sensing for object verification, according to various embodiments. Embodiments of the method 1100 begin at stage 1104 by capturing, using an image sensor, raw image data of an object characterized by 3D feature regions. Each 3D feature region is associated with a respective expected depth and/or a respective expected textural signature. For example, the object can be a human face, one feature region can correspond to a portion of a cheek, and another feature region can correspond to a portion of a nose. While some descriptions herein specifically discuss a face and related features, techniques described herein can be used for verification of any suitably distinguishable three-dimensional object. For example, a valuable ancient ceramic vase can include characteristic features, such as handles, cracks, pits, imagery, etc.; and techniques described herein can be used to verify the authenticity of the vase.

At stage 1108, embodiments can identify multiple characteristic sub-images from the raw image data. Each characteristic sub-image can be identified at least by mapping a corresponding one of the 3D feature regions to the raw image data. For example, image processing can be used to approximate locations of characteristic features to provide a rapid set of pre-decisions, such as whether the imaged object appears to be a human face, the approximate orientation of the face, etc. In some implementations, the imaging system seeks at least a subset of traceable structures within the image of the object. For example, sets of features can be extracted from one or more chromatic components of the image of the object (e.g., from the image as a whole as obtained in stage 1104, and/or from characteristic sub-images identified in stage 1108). In some cases, some or all of the traceable structures are obtained in a registration phase, for example, by prompting a user to capture and/or provide multiple images of the object (e.g., of the user's face). Additionally or alternatively, some or all of the traceable structures can be derived from a generalized model (e.g., a generalized anatomical model of a human face). Whether obtained from registration of an actual object or from a model, the data store can include a full 3D model, a partial 3D model, a lookup table of measurements, and/or any other suitable information. The traceable structures can include any suitable micro-structures and/or macro-structures of the object. For example, in context of a human face, the traceable structures can include pores, moles, eyebrows, eye irises, eye corners, eyelashes, eyelids, nose features, mouth features, lip features, etc.

Successful identification by the imaging system of at least a threshold number of traceable structures within the image (and/or sub-images) of the object can facilitate certain capabilities. One such capability is a rapid verification of identity of the object. For example, if the traceable structures are associated with prior registration of a particular user, identification of sufficient traceable structures in the present object imaging can provide a rapid biometric verification of whether the presently imaged user matches the registered user. The strength of verification can depend on factors, such as the minimum number of traceable structures that must be identified for positive verification, the types of traceable structures being used, the biometric uniqueness of those features, the consistency of those features over time, etc. Other such capabilities include rapid (e.g., and potentially coarse) determinations of the type of object. If multiple traceable structure sets are stored (e.g., based on different registrations, different models, etc.), identified traceable structures from the object imaging may have a much higher mathematical correspondence to certain of the stored feature sets than to others. For example, the identified traceable structures can provide a quick indication that a face appears to be present in the image. Other such capabilities include rapid (e.g., and potentially coarse) determinations of object distance. For example, a comparison of traceable structure separations (e.g., distance between eye irises) to a known median distance, or other suitable information, can suggest an approximate distance of the face from the lens, which can provide an initial estimate for calibration, a baseline distance for relative depth measurements, etc. Similarly, the arrangement of the identified traceable structures can provide an indication of the orientation of the object relative to the imaging system. For example, the face may be tilted, angled away from the imaging system, etc.; thereby causing a corresponding change in the relative arrangements of the traceable structures.

At stage 1112, embodiments can obtain, from the raw image data for each characteristic sub-image, a respective first chromatic response from imaging the object with the image sensor, and a respective second chromatic response from imaging the object with the image sensor. In some implementations, each respective first chromatic response corresponds to a first wavelength of light reflected off of the object and detected by the image sensor, and each respective second chromatic response corresponds to a second wavelength of the light reflected off of the object and detected by the image sensor, with the first wavelength being distinguishable from the second wavelength by the image sensor. In some such implementations, a first subset of photodetector elements of the image sensor (e.g., one or more photodetector elements in each pixel of an array) is configured to detect the first wavelength of light, and a second (e.g., disjoint) subset of photodetector elements of the image sensor (e.g., one or more photodetector elements in each pixel of an array) is configured to detect the second wavelength of the light. In some implementations, the sensor system (e.g., the lens, the detection plane of the sensor array, etc.) is focused according to a particular focal wavelength. The focal wavelength can be the first wavelength, the second wavelength, or a third wavelength different from the first and second wavelengths. For example, the image sensor can be focused according to a green wavelength, and the first and second wavelengths can correspond to red and blue wavelengths, respectively.

At stage 1116, embodiments can compute, based on the respective first chromatic response and the respective second chromatic response for each characteristic sub-image, a respective computed depth and/or a respective computed textural signature. As described above, some implementations can compute a ratio between a first magnitude of chromatic response (MCR) derived from the respective first chromatic response and a second MCR derived from the respective second chromatic response, and at least the respective computed depth can be computed based on the ratio. For example, such computations can yield absolute depth measurements when the imaging system is properly calibrated; or such computations can yield at least relative depth measurements without calibration.

In other implementations, the different chromatic responses for each (of some or all) characteristic sub-image obtained in stage 1112 are compared to determine relative differences in sharpness. For example, statistics can be computed across an image brightness plot for each chromatic response to indicate relative image sharpness. The differences in sharpness for different chromatic components can indicate which regions are closer or further from the lens. For example, such computations can yield relative depth measurements across different feature regions (e.g., indicating that the tip of the nose is closer than the corners of the eyes, etc.).

In other such implementations, relative traceable structure sizes and/or inter-structure distances can be measured and compared to known (or modeled) values to determine depth. For example, sets of traceable structures can be extracted from one or more chromatic components of the image of the object (e.g., from the image as a whole, and/or from characteristic sub-images), and measurements can be obtained from those extracted traceable structures. In some implementations, traceable structure locations and/or sizes are obtained based on statistical analyses of the chromatic component signatures. For example, a same textural signature can be analyzed over different chromatic images to determine which chromatic component yields the highest contrast view of traceable structures in a region of the object, and that chromatic component can be used to help determine traceable structure boundaries and/or other measurements. In some implementations, the chromatic components can be used to derive depth information for the particular traceable structures to help correct for three-dimensional variations in measurement. For example, the angle of a user's face with respect to the imaging system can appreciably impact measurements between traceable structures, and depth information can be used to correct for those impacts.

As described above, with reference to stage 1108, extraction of traceable structure sets from the imaging data can facilitate a number of capabilities. In some implementations, the identification and/or extraction of traceable structures based on the chromatically differentiated responses can be used in addition to, or instead of, the traceable structure identifications described with reference to stage 1108 to facilitate the same or different capabilities. For example, micro-features, such as skin texture, pores, freckles, and the like, may not be sufficiently identifiable without the benefit of chromatic responses at stage 1116. Either way, the identified traceable structures can be used to obtain and/or calculate feature measurements, and those obtained and/or calculated feature measurements can then be compared with measurements obtained or determined previously. In some cases, sizes of particular traceable structures can be known and/or certain distances between traceable structures can be known based on a registration of images of the object at a prior time. For example, in a registration phase, images can be obtained of a user's face, and feature sizes and/or distances can be extracted from those images and stored to a data store. In other cases, sizes of particular traceable structures can be known and/or certain distances between traceable structures can be approximated based on models, such as a generalized model of a human face. As noted above, the stored registration and/or model data can include any suitable measurements and/or other information.

As used herein, traceable structure sizes, distances, depths, etc. are intended to broadly include any suitable measurement data to support implementations described herein. For example, with reference to traceable structure distances, such distances can be evaluated individually, or relative to other traceable structures. For example, a particular distance can be used on its own, a ratio between that distance and one or more other distances can be used, statistical variations across distances can be used, etc. Similarly, the size of a particular traceable structures (e.g., a mole, an iris, etc.) can be used on its own, or in context of ratios, statistical variations, or other information. The size of a particular traceable structure can also include shape information. For example, the traceable structure size can indicate whether the traceable structure is generally round (e.g., with associated measurements, such as radius, diameter, etc.), can include an outline representation of the shape of the traceable structure, etc. Similarly, a traceable structure depth can refer to a single measurement value associated with the approximate depth of a traceable structure, with a series of depth measurements that indicates texture, with an image brightness signature that corresponds to texture, with an absolute depth measurement, with a relative depth measurement as related to other traceable structures (e.g., an approximate distance nearer or further than one or more other traceable structures; as opposed to an absolute measurement), with a relative depth position (e.g., indicating that a traceable structure is generally nearer or further than another traceable structure; indicating that a traceable structure appears to be slightly nearer or further than, or appreciably nearer or further than another traceable structure; etc.), and/or any other suitable measurement.

At stage 1120, embodiments can output a verification signal for the object based on comparing computed response values with expected feature region characteristic values. For example, the respective computed depth of each characteristic sub-image can be compared with the respective expected depth of the corresponding 3D feature region, and/or the respective computed textural signature of each characteristic sub-image can be compared with the respective expected textural signature of the corresponding 3D feature region. The verification signal can include any suitable information and can be formatted in any suitable manner to effect a desired response. In one implementation, in response to object verification, outputting the verification signal triggers an indicator to inform a human or computational agent of the verification result. For example, the verification signal can trigger a illumination of an indicator (e.g., a green LED to indicate successful verification), playing of a sound, haptic feedback, etc. In another implementation, the object verification signal can trigger an access control system to permit or deny access to a physical or electronic resource. For example, successful verification can result in unlocking of a physical doorway or physical vault, access to a computational system or digital file, etc.

The object verification can be used for any suitable type of object classification, object spoof detection, and/or biometric identification. Regarding classification, the verification signal can indicate verification that an object is characteristics of a particular type or category of object. For example, the identified traceable structures (e.g., and/or their respective depths, measurements, etc.) in the imaged object appear to be generally characteristic of a human face, of a particular insect species, of a particular type of material or surface finish, etc. Regarding biometric verification, the verification signal can indicate that an object of an asserted identity matches that identity with at least a threshold biometric confidence level. For example, the verification signal indicates whether the imaged object appears to be characteristic of part of pre-registered human user's face. Regarding spoof detection, the verification signal can indicate whether the imaged object is "real" or "fake." For example, conventional face detection systems can often be spoofed using a 2D image of a face, or a 3D model (e.g., a wax model) of a face. Neither a 2D nor a 3D spoof is likely to include the types of depth signatures, textural signatures, micro-structures, etc. that are verifiable using the techniques described herein.

Figure 12:
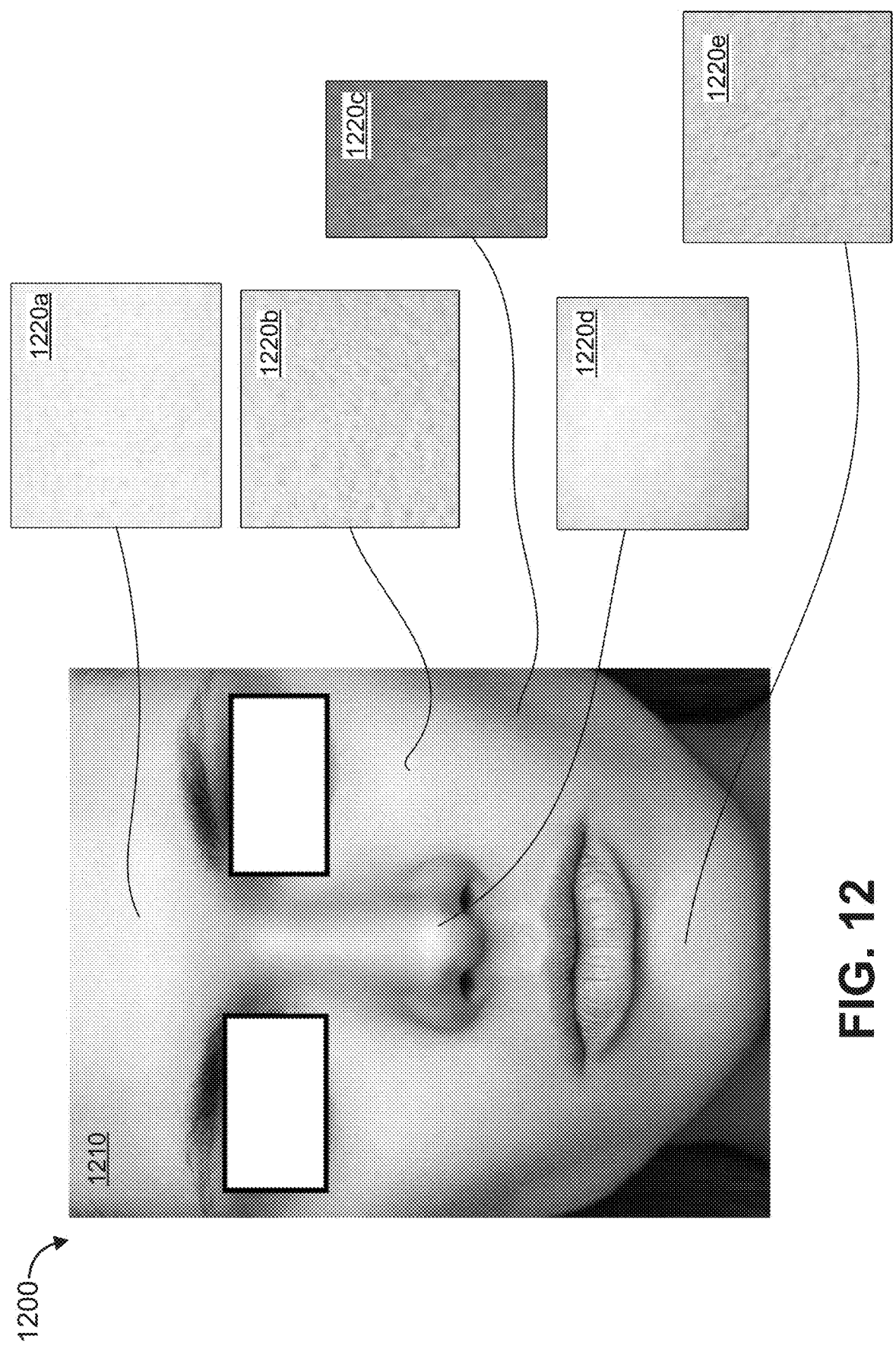
FIG. 12 shows an illustrative set of imaging data as a context for various embodiments described herein.

FIG. 12 shows an illustrative set of imaging data 1200 as a context for various embodiments described herein. The illustrative set of imaging data 1200 includes a high-definition image 1210 of a portion of a human face, and multiple characteristic sub-images 1220, each associated with a respective feature region, as described herein. The illustrative set of imaging data 1200 is intended only to illustrate features of embodiments, and is not intended to limit the types of images described herein. For example, though the illustrative set of imaging data 1200 includes processed output images from imaging systems, some embodiments described herein rely on imaging data that includes raw output data from image sensors (e.g., that has not been color-corrected, or otherwise processed).

Notably, as described above, such an "object" (i.e., the imaged portion of the human face) shown in image 1210 includes a number of different types of traceable structures. For example, the face image 1210 includes macro-structures, such as skin regions, eyebrows, eyes, eyelashes, eyelids, a nose, nostrils, a mouth, lips, etc. Each of these macro-structures can include micro-structures. For example, a skin region can include freckles, pores, scars, moles, and/or other traceable structures; and each eye can include corner points, an iris center, vein patterns, etc. These traceable structures can have different associated uniqueness and/or consistency over time for a particular user. For example, numbers and locations of freckles can appreciably change on a user's face with different amounts of recent exposure to the sun, or for other reasons; but pore patterns, eye vein patterns, relative positions of eye corners, and/or other traceable structures can remain consistent over time. For the sake of illustration, skin texture and pore patterns can be clearly seen in some of the characteristic sub-images 1220.

Figure 13A:
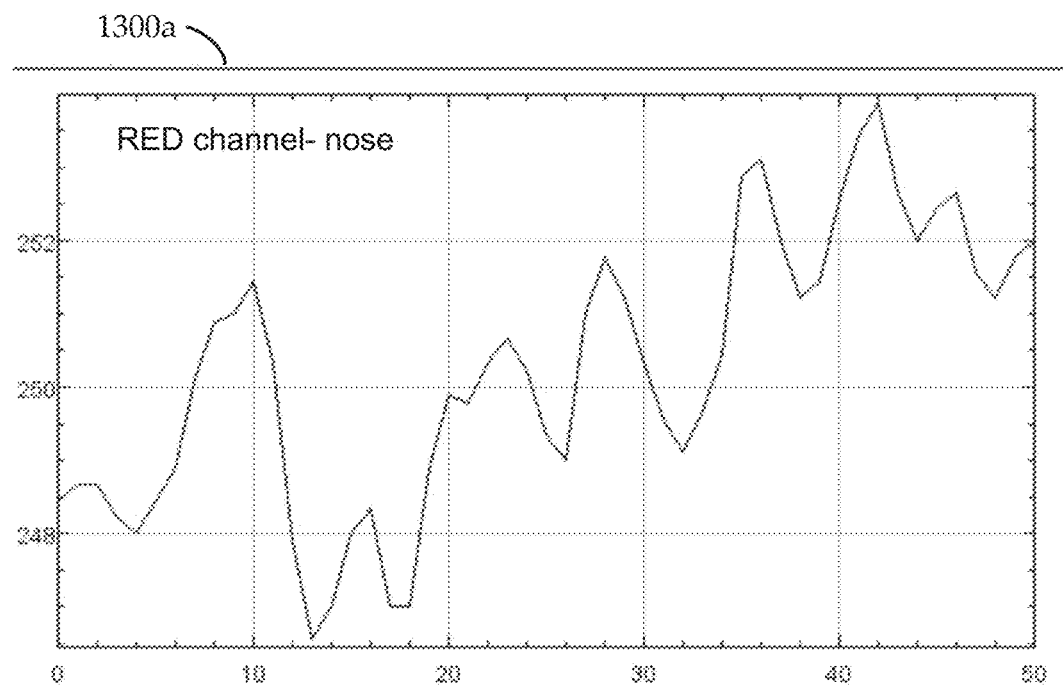
FIGS. 13A and 13B show illustrative partial chromatic responses for illustrative portions of two characteristic sub-images.
Figure 13A:
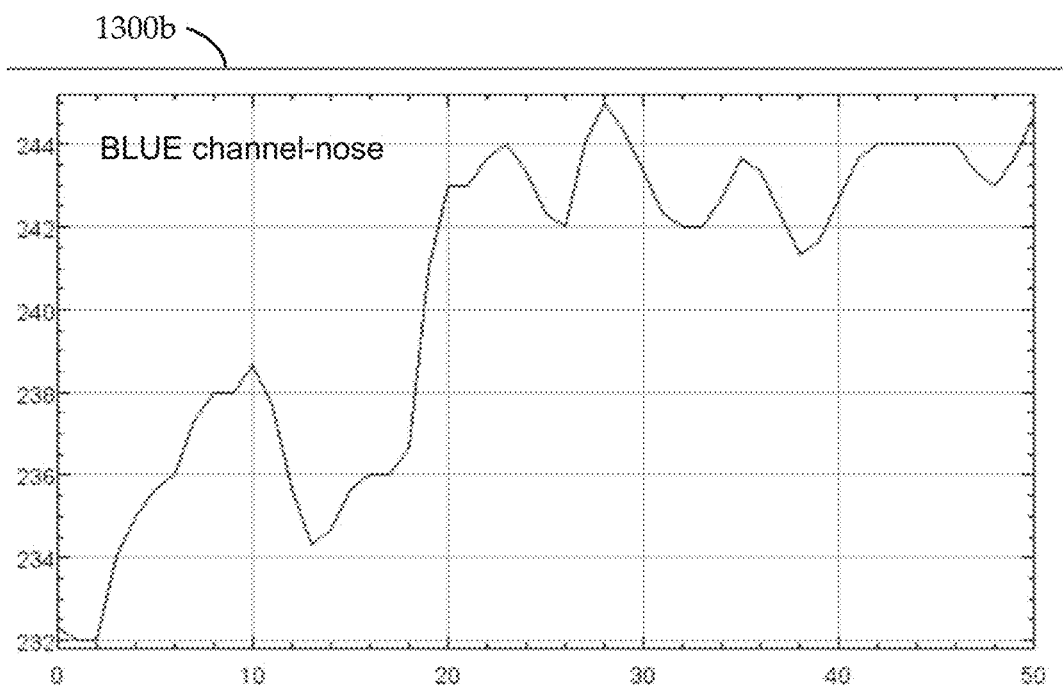
Figure 13B:
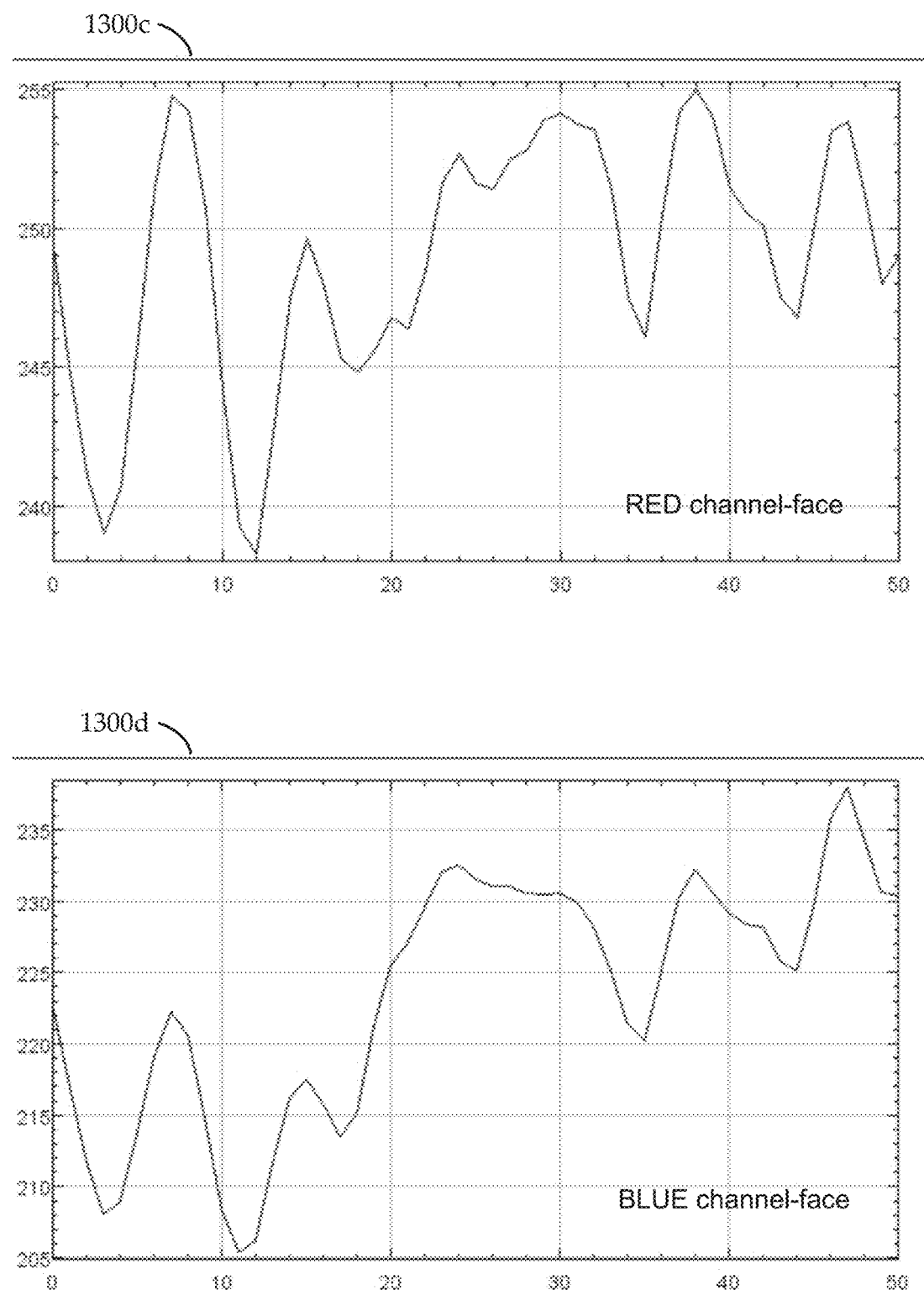

FIGS. 13A and 13B show illustrative partial chromatic responses 1300 for illustrative portions of two characteristic sub-images. In particular, FIG. 13A shows particular chromatic responses 1300a and 1300b for an illustrative portion of characteristic sub-image 1220d of FIG. 12, which corresponds to a feature region around the tip of the nose. As such, the characteristic sub-image 1220d is in the portion of the image nearest to the imaging system. FIG. 13B shows particular chromatic responses 1300c and 1300d for an illustrative portion of characteristic sub-image 1220b of FIG. 12, which corresponds to a feature region around the cheek. As such, the characteristic sub-image 1220b is in a portion of the image relatively farther away from the imaging system (as compared to characteristic sub-image 1220d).

For the chromatic responses 1300, it can be assumed that the imaging system was focused using a medium-wavelength chromatic component, such as using "green" chromatic responses. Chromatic responses 1300a and 1300c correspond to "red" chromatic responses in portions of characteristic sub-images 1220d and 1220b, respectively; and chromatic responses 1300b and 1300d correspond to "blue" chromatic responses in the same portions of the characteristic sub-images 1220d and 1220b, respectively. Each illustrated chromatic response 1300 is an image brightness plot, shown as a plot of brightness value of the chromatic component (e.g., signal level of corresponding photodetector elements) versus location, over a fifty-pixel-long row of an image sensor array.

Multiple types of information can be obtained from the chromatic responses 1300. To obtain such information, implementations can compute statistics to measure the distribution of brightness slopes, standard deviations of brightness valley depths, profile valley widths, and/or other values. One type of information that can be extracted or derived from such computations is sharpness and/or depth. Turning first to FIG. 13A, it can be seen that the slope changes of the red chromatic response 1300a are appreciably larger than those of the blue chromatic response 1300b. This indicates a higher sharpness of the data in the red portion of the spectrum, which also indicates a closer relative depth (as described above). Turning to FIG. 13B, it can be seen that the slope changes of the blue chromatic response 1300d are appreciably larger than those of the red chromatic response 1300c. This indicates a higher sharpness of the data in the blue portion of the spectrum, which also indicates a farther relative depth. Even obtaining a coarse set of relative depths can be useful for various capabilities. For example, in context of spoof detection, such relative depths can indicate that the imaged object is a 3D object (e.g., as opposed to a 2D photograph), or even that the set of relative depths is characteristic of the object being imaged (e.g., the set of depths matches what would be expected for a human face). Herein, the chromatic response data clearly confirms that the feature region corresponding to the tip of the nose is closer than the feature region corresponding to the cheek, as would be expected for a non-spoof human face.

Another type of information that can be extracted or derived from such computations is a textural signature. The pattern of peaks and valleys in the chromatic responses 1300 can correspond, for example, to the pores and/or other textural variations of the skin in the respective portions of the respective characteristic sub-images 1220. It can be seen that the textural signature of chromatic response 1300a is similar to that of chromatic response 1300b, and the textural signature of chromatic response 1300c is similar to that of chromatic response 1300d; indicating that the textural signature can be correlated to particular feature regions and is not as dependent on evaluating any particular chromatic component. Indeed, implementations can use any suitable one or more chromatic components to obtain the textural signature. Such a textural signature can be useful for various capabilities. For example, in context of spoof detection, such textural signatures can indicate that the imaged object is a 3D object, that the textural signature is characteristic of the object being imaged (e.g., characteristic of human facial skin), and/or even that the textural signature matches a previously registered textural signature for the object (e.g., to provide biometric verification against previous registration of a user's face).

Figure 14:
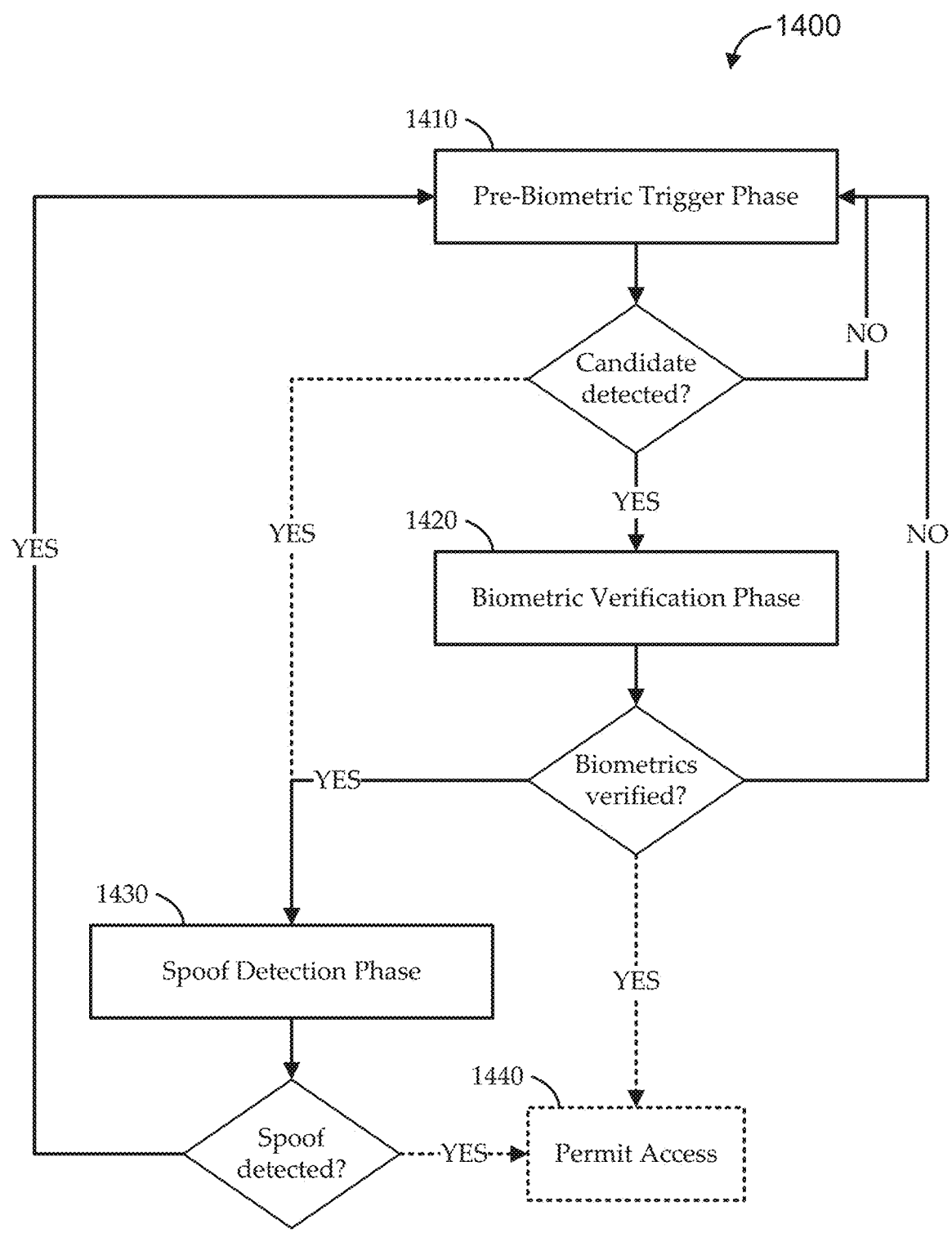
FIG. 14 shows a flow diagram of an example gated process for access control, according to various embodiments.

In accordance with the above, a number of different types of use cases are possible. FIG. 14 shows a flow diagram 1400 of an example gated process for access control, according to various embodiments. For example, an example use can involve a user seeking access to a smart phone having an integrated image sensor system, such as described herein. Access to the smart phone is locked until the user successfully passes a biometric verification of the user's face based on previously registered data. Biometric verification generally refers to verifying biometrics of a candidate user (or other object) against corresponding biometrics of a previously registered user. Biometric verification can be much simpler than so-called biometric identification. For example, biometric identification may seek to determine the identity of a candidate user from a general population of users, such as my determining whether a fingerprint matches any of a large database of fingerprints to at least some threshold confidence level; while biometric verification can begin with an assumed set (e.g., one or a relatively small number) of pre-registered users, and can seek to determine whether a current candidate user seems to match one of the assumed set of users to a threshold level of confidence. Biometric access control systems, like those of the example smart phone, are typically based on biometric verification. For example, the smart phone (or similarly, an identification badge, an electronic door lock, etc.) may only be associated with a single authorized user, and the function of the system is to determine whether a candidate user attempting access appears (e.g., statistically) to be the authorized user. Such a function does not require the system to search a huge database in an attempt to identify the candidate user.

In a pre-biometric trigger phase 1410, embodiments can wait to detect a candidate image or images, which can trigger further biometric verification. For example, the image sensor can continuously, periodically, or otherwise obtain images. The images can be dynamically processed to detect a set of image data that is generally characteristic of a face, or otherwise of a candidate for biometric verification. For example, certain traceable structures are detected in a particular pattern (e.g., at relative locations, sizes, etc.) that indicate to the system that the captured image is a candidate face image for biometric processing. In some implementations, this phase 1410 can use various techniques to improve the detection of such traceable structures. For example, the phase 1410 can include focusing the imaging system based on one or more parameters, such as based on a chromatic component; and/or the phase 1410 can include analysis of individual chromatic components of the raw image data (e.g., including computing statistical analyses of image brightness plots, etc.); and/or the phase 1410 can involve correcting imaging data for parameters, such as contrast, spectrum reflectance, spectrum illumination inequality, surface transmission, etc.

In a biometric verification phase 1420, the same and/or different traceable structures are used for biometric verification of the pre-registered user. In some implementations, the imaging data obtained in phase 1410 is sufficient for the biometric verification in phase 1420. In other implementations, additional and/or different imaging data is obtained, such as high-definition data with multiple chromatic components. In some embodiments, the phase 1420 can involve resizing and/or reorienting the obtained data, and/or correcting the data for size and/or orientation. For example, as described above, certain traceable structures have known sizes, certain distances are known between traceable structures, etc. Comparing such known information to the obtained information can provide information as to the distance of the imaged object from the imaging system (e.g., objects appear smaller as they move farther from the imaging system), and/or to the orientation of the imaged object with respect to the imaging system (e.g., when the imaged object is tilted, its set of traceable structures is tilted in a deterministic manner). In some implementations, parameters of the imaging system are also known and can be used in this phase 1420. For example, correlations between size and distance can be a function of certain lens parameters, focusing data, etc. As described above, the biometric verification can be based on determining whether the traceable structures (e.g., sizes, locations, separations, shapes, etc.) appear to match those of the registered object. Further as described above, biometric verification in phase 1420 can additionally or alternatively be based on textural signatures being characteristic of a registered user. Further as described above, biometric verification in phase 1420 can additionally or alternatively be based on depth information computed from chromatic differentiation. For example, phase 1420 can include computing relative and/or absolute depth measurements at any suitable level of precision for use in determining whether the depths are characteristic of the registered user.

Some embodiments end with successful passage of the biometric verification phase 1420. For example, passing the biometric verification phase 1420 triggers output of a verification signal, which triggers an access control system to permit access at phase 1440 (e.g., the smart phone unlocks). Other embodiments further include a spoof detection phase 1430. For example, successful passage of the biometric verification in phase 1420 can trigger a final hurdle of the spoof detection phase 1430, which must also be passed prior to permitting access by an access control system at stage 1440. As described above, such a spoof detection phase 1430 can use information obtained in the biometric verification phase 1420, and/or can obtain any suitable information, to determine whether the candidate object is a spoof. For example, image brightness plots can be used to calculate contrasts in different chromatic channels (e.g., red/green/blue, infrared, etc.); and lens focal length, chromatic difference, and/or other factors can be used to calculate the face depth information by checking the image size changes and/or image contrasts at positions corresponding to traceable structures. In some implementations, the spoof detection phase 1430 uses depth information and/or textural signatures to determine whether the candidate object is 2D or 3D, and/or whether the depth and/or textural information is characteristic of the type of object being imaged. For example, in context of a user's face, the depth and/or textural information may indicate that various traceable structures appear to be at depths that are within a sensible range for a generalized model of a human face, that various traceable structures appear to be at depths that are statistically consistent with pre-registered values for the user's face, that textures appear consistent with those of generalized human skin, that textures appear consistent with those of pre-registered textures of the user's face, etc.

Some embodiments may include only one or two of the phases of the flow diagram 1400, and the various phases can be performed in any order. In some embodiments, the spoof detection phase 1430 and the biometric verification phase 1420 are performed sequentially. For example, successful passage of the biometric verification phase 1420 triggers a start of the spoof detection phase 1430. In other embodiments, the biometric verification phase 1420 and the spoof detection phase 1430 are performed concurrently (i.e., at least partially in parallel). In some embodiments, some or all phases can be independently triggered. For example, a user can explicitly trigger a biometric verification phase 1420, such that the phase 1420 is not responsive to successful identification of a candidate in phase 1410. Similarly, a user can explicitly trigger a spoof detection phase 1430 without an associated biometric verification phase 1420. For example, there may be an instance where the user desires to know whether an object is a spoof without determining any type of biometric verification of the object.

Various types of enhancements can be included in various embodiments. In some implementations, direct use of the image brightness plots, and/or the like, without further correction can yield incorrect results. For example, different skin pigmentations, material types, surface finished, etc. can appreciably impact brightness, contrast, and/or other parameters. As one example, the color of an object can impact the relative outputs of the chromatic component channels (e.g., a red object can yield relatively high red component brightness values not representative of depths, traceable structures, focus, etc.).

According to one such enhancement, embodiments can seek high contrast marks to use as traceable structures in one or more phases. Relatively high contrast surface marks and associated mark positions can be recognized and stored during a registration operation. For any subsequently acquired sharp image, the image contrast of corresponding marks is substantially linearly proportional to the contrasts of those marks obtained during the registration. As such, comparing contrast ratios among the various chromatic component channels (e.g., during the pre-biometric trigger phase 1410, the biometric verification phase 1420, etc.) can appreciably reduce or eliminate influences of the mark contrasts in the registration data, especially at positions corresponding to known high-contrast marks. For example, as described herein, certain traceable structures information can be described by image brightness distributions, such that detection of certain traceable structures can be realized through processing the image brightness data statistics (e.g., tracing the brightness slopes can detect an image size of a traceable structure and evaluate the contrast/blur change for the traceable structure). Relatedly, any chromatic component used for focus may not yield an ideal focus in practice due, for example, to focal tolerances. For example, each chromatic channel tends to manifest a different amount of blurring at any particular focal configuration. Implementations herein can calculate contrast ratios among the multiple channels, for example, to compute depth information for traceable structures. For example, when a marked zone is accurately imaged in the green channel (assuming the imaging system is focused based on the green channel), the green contrast is the highest; both the blue and red channel contrasts are lower than that of the green channel. If another object (or another feature region) is located further from the imaging system, the green and blue channel contrasts tend to decrease, while the red channel contrast tends to increase (i.e., further object distance means closer image distance).

According to another such enhancement, embodiments can seek to reduce or eliminate influences of object pigmentation, illumination inequality, and/or the like. For example, different skin pigmentations can manifest different reflectance at different wavelength, and/or unequal illumination power levels. In such cases, a direct comparison of brightness in different chromatic component channels can yield incorrect results with respect to image sharpness or blur. As such some embodiments at least partially normalize these influences. In some such embodiments, brightness of M×N pixels is evaluated to determine sharpness of an image at a particular position, and standard deviation can be computed as the parameter. The data can then be normalized based on the standard deviation and the mean of the brightness values (e.g., as a function of standard deviation divided by mean). Such a normalization can reduce or eliminate the influences of object pigmentation, illumination inequality, and/or the like, but will tend not to be affected by spectrum reflectance or spectrum illumination inequality.

According to one such enhancement, embodiments can seek to reduce or eliminate influences of object material optical transmission. Types of material characteristics can appreciably affect the amount of light that transmits into the material, the amount of light scattered by the material, the amount of light reflected back from the material, etc. For example, light shining on a human face will tend to partially transmit into the skin of the face, but skin pigmentations and/or other skin characteristics can influence the amount of transmission, penetration depth, etc. As such, transmitted light power is partially scattered out and contributes to image brightness. For example, the scattered-out portion of light can increase the average brightness in a region, thereby reducing image brightness contrast in that region. Some embodiments can reduce this influence. For example, when imaging a face using red-green-blue (RGB) chromatic components, many face pigmentations will yield a weakest transmission in the blue chromatic component. When the face is illuminated by white light, embodiments can use a blue channel mean to replace red and green channel means in the normalization process described above, while maintaining the same standard deviations. In some implementations, other techniques are used to correct deviations of the illumination light from white light prior to implementing such a technique.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for passive image depth sensing for object verification, the method comprising:
    capturing, using an image sensor, raw image data of an object characterized by three-dimensional (3D) feature regions, each 3D feature region associated with a respective expected depth and/or a respective expected textural signature;
    identifying a plurality of characteristic sub-images from the raw image data, each identified at least by mapping a corresponding one of the 3D feature regions to the raw image data;
    obtaining, from the raw image data for each characteristic sub-image, a respective first chromatic response from imaging the object with the image sensor, and a respective second chromatic response from imaging the object with the image sensor;
    computing, based on the respective first chromatic response and the respective second chromatic response for each characteristic sub-image, a respective computed depth and/or a respective computed textural signature; and
    outputting a verification signal for the object based on comparing the respective computed depth of each characteristic sub-image with the respective expected depth of the corresponding 3D feature region, and/or on comparing the respective computed textural signature of each characteristic sub-image with the respective expected textural signature of the corresponding 3D feature region.

2. The method of claim 1, wherein:
    each respective first chromatic response corresponds to a first wavelength of light reflected off of the object and detected by the image sensor;
    each respective second chromatic response corresponds to a second wavelength of the light reflected off of the object and detected by the image sensor; and
    the first wavelength is distinguishable from the second wavelength by the image sensor.

3. The method of claim 1, wherein the computing comprises, for each characteristic sub-image:
computing a ratio between a first magnitude of chromatic response (MCR) derived from the respective first chromatic response and a second MCR derived from the respective second chromatic response; and
determining at least the respective computed depth based on the ratio.

4. The method of claim 1, wherein:
the object is associated with a stored generalized object model that defines, for each of the plurality of 3D feature regions, the respective expected depth and/or the respective expected textural signature; and
the verification signal indicates whether the object is a spoof.

5. The method of claim 1, wherein:
each 3D feature region is pre-associated with the respective expected depth and/or the respective expected textural signature obtained from the object and stored during a registration phase of operation prior to the capturing; and
the verification signal indicates whether the object is a spoof.

6. The method of claim 5, wherein the verification signal further indicates whether an identity of the user is verified.

7. The method of claim 1, wherein:
the object comprises a plurality of anatomical features of a user, each anatomical feature having respective stored feature data indicating at least a location, a shape, and/or a size of the anatomical feature, the stored feature data obtained and stored during a registration phase of operation prior to the capturing;
the computing comprises extracting feature measurements corresponding to at least a portion of the stored feature data for at least some of the plurality of anatomical features; and
the outputting comprises computing a biometric verification of the user based at least on comparing the feature measurements to the stored feature data, such that the verification signal further indicates whether an identity of the user is verified based on the biometric verification.

8. The method of claim 7, wherein:
the extracting the feature measurements comprises tracing brightness distribution characteristics of the respective first chromatic response and/or the respective second chromatic response for each characteristic sub-image; and
the computing the biometric verification comprises computing the respective computed textural signature based on the brightness distribution characteristics.

9. The method of claim 7, further comprising:
computing estimated distance data for the object based at least on comparing the feature measurements to the stored feature data,
wherein the computing the respective computed depth and/or the respective computed textural signature is based at least partially on the computing the estimated distance data.

10. The method of claim 7, wherein the computing the biometric verification is performed at least partially in parallel with the computing the respective computed depth and/or the respective computed textural signature.

11. The method of claim 1, wherein:
the computing the respective computed depth and/or the respective computed textural signature is based on image brightness statistic parameters, and the computing comprises normalizing the image brightness statistic parameters across the respective first chromatic response and the respective second chromatic response for at least one of the characteristic sub-images.

12. The method of claim 1, wherein:
each 3D feature region is further associated with a respective expected location on the object; and
the identifying comprises processing the raw image data to identify respective estimated locations for at least two of the 3D feature regions based on the respective expected locations, and mapping each corresponding one of the at least two of the 3D feature regions to the raw image data based on the respective estimated locations.

13. The method of claim 1, wherein:
each 3D feature region associated with the respective expected depth and the respective expected textural signature;
the computing comprises computing, based on the respective first chromatic response and the respective second chromatic response for each characteristic sub-image, the respective computed depth and the respective computed textural signature; and
the outputting is based on comparing the respective computed depth of each characteristic sub-image with the respective expected depth of the corresponding 3D feature region, and on comparing the respective computed textural signature of each characteristic sub-image with the respective expected textural signature of the corresponding 3D feature region.

14. The method of claim 1, wherein the object comprises at least a portion of a human face.

15. A passive image depth sensing system for object verification, the system comprising:
a lens assembly to receive light reflected off of an object and to focus chromatic components of the received light in accordance with respective focal lengths, the object characterized by three-dimensional (3D) feature regions, each associated with a respective expected depth and/or a respective expected textural signature;
an image sensor in optical communication with the lens assembly and comprising a plurality of photodetector elements comprising first photodetector elements to produce first chromatic responses to a first chromatic component of the received light, and second photodetector elements to produce second chromatic responses to a second chromatic component of the received light; and
a processor configured to:
identify, from raw image data of the object captured by the image sensor, a plurality of characteristic sub-images by mapping corresponding ones of the 3D feature regions to the raw image data;
obtain, from the raw image data for each characteristic sub-image, a respective first chromatic response and a respective second chromatic response;
compute, based on the respective first chromatic response and the respective second chromatic response for each characteristic sub-image, a respective computed depth and/or a respective computed textural signature; and
output a verification signal for the object based on comparing the respective computed depth of each characteristic sub-image with the respective expected depth of the corresponding 3D feature region, and/or on comparing the respective computed textural signature of each characteristic sub-image with the respective expected textural signature of the corresponding 3D feature region.

16. The system of claim 15, wherein:
each respective first chromatic response corresponds to a first wavelength of light reflected off of the object and detected by the image sensor;
each respective second chromatic response corresponds to a second wavelength of the light reflected off of the object and detected by the image sensor; and
the first wavelength is distinguishable from the second wavelength by the image sensor.

17. The system of claim 15, wherein the processor is configured to perform the computing at least by, for each characteristic sub-image:
computing a ratio between a first magnitude of chromatic response (MCR) derived from the respective first chromatic response and a second MCR derived from the respective second chromatic response; and
determining at least the respective computed depth based on the ratio.

18. The system of claim 15, further comprising:
a data store having stored thereon a generalized object model that defines, for each of the plurality of 3D feature regions, the respective expected depth and/or the respective expected textural signature.

19. The system of claim 15, further comprising:
a data store having stored thereon the respective expected depth and/or the respective expected textural signature for each 3D feature region obtained from the object and stored during a registration phase of operation prior to capturing the raw image data by the image sensor.

20. The system of claim 15, further comprising:
a data store having stored thereon respective feature data for each of a plurality of deterministic features of the object, the stored feature data indicating at least locations, shapes, and/or sizes of the deterministic features obtained and stored during a registration phase of operation prior to capturing the raw image data by the image sensor,
wherein the processor is configured to perform the computing at least by extracting feature measurements corresponding to at least a portion of the feature data for at least some of the plurality of deterministic features; and
wherein the processor is configured to perform the outputting at least by computing a biometric verification of a user associated with the object based at least on comparing the feature measurements to the feature data.

21. The system of claim 20, wherein:
the extracting the feature measurements comprises tracing brightness distribution characteristics of the respective first chromatic response and/or the respective second chromatic response for each characteristic sub-image; and
the computing the biometric verification comprises computing the respective computed textural signature based on the brightness distribution characteristics.

22. The system of claim 20, wherein the process is further configured to:
compute estimated distance data for the object based at least on comparing the feature measurements to the stored feature data,
wherein the computing the respective computed depth and/or the respective computed textural signature is based at least partially on the computing the estimated distance data.

23. The system of claim 20, wherein the processor is configured to compute the biometric verification at least partially in parallel with the computing the respective computed depth and/or the respective computed textural signature.

24. The system of claim 20, further comprising:
an illumination source to project probe illumination onto one or more locations of a field of view of the image sensor comprising the object to produce one or more of the deterministic features.

25. The system of claim 15, wherein:
the computing the respective computed depth and/or the respective computed textural signature is based on image brightness statistic parameters, and the computing comprises normalizing the image brightness statistic parameters across the respective first chromatic response and the respective second chromatic response for at least one of the characteristic sub-images.

26. The system of claim 15, wherein:
each 3D feature region is further associated with a respective expected location on the object; and
the processor is configured to perform the identifying at least by processing the raw image data to identify respective estimated locations for at least two of the 3D feature regions based on the respective expected locations, and mapping each corresponding one of the at least two of the 3D feature regions to the raw image data based on the respective estimated locations.

27. The system of claim 15, wherein the passive image depth sensing system is configured to be integrated in a portable electronic device.

28. The system of claim 15, wherein the passive image depth sensing system is configured to couple with an access control function that is configured to permit or deny access to a physical or an electronic resource based on the verification signal.

* * * * *